(12) United States Patent
Terry et al.

(10) Patent No.: US 7,042,180 B2
(45) Date of Patent: May 9, 2006

(54) BRUSHLESS AND SENSORLESS DC MOTOR CONTROL SYSTEM WITH LOCKED AND STOPPED ROTOR DETECTION

(75) Inventors: Robert L. Terry, Tecumseh, MI (US); Arnold G. Wyatt, Jackson, MI (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 10/763,452

(22) Filed: Jan. 23, 2004

(65) Prior Publication Data

US 2005/0029976 A1 Feb. 10, 2005

Related U.S. Application Data

(60) Provisional application No. 60/442,648, filed on Jan. 24, 2003.

(51) Int. Cl.
*H02H 5/04* (2006.01)

(52) U.S. Cl. .............. 318/434; 318/254; 318/459; 318/473; 388/909; 361/24

(58) Field of Classification Search .............. 318/138, 318/254, 430–434, 439, 459, 471–473, 504, 318/720–724; 388/909, 910, 928.1, 934; 363/23–34

See application file for complete search history.

(56) References Cited

U.S. PATENT DOCUMENTS

| | | | |
|---|---|---|---|
| 4,808,902 A * | 2/1989 | Miyazaki et al. ........... 318/798 |
| 4,928,043 A | 5/1990 | Plunkett ..................... 318/254 |
| 5,223,772 A * | 6/1993 | Carobolante ................ 318/254 |
| 5,376,866 A * | 12/1994 | Erdman ....................... 318/254 |
| 5,574,608 A | 11/1996 | Fukuoka |
| 5,642,247 A * | 6/1997 | Giordano ..................... 361/31 |
| 5,764,020 A | 6/1998 | Maiocchi |
| 5,801,500 A | 9/1998 | Jensen et al. |
| 5,818,179 A | 10/1998 | Kokami et al. |
| 5,838,128 A | 11/1998 | Maiocchi et al. |
| 6,005,359 A | 12/1999 | Brambilla et al. |
| 6,011,368 A | 1/2000 | Kalpathi et al. |

(Continued)

FOREIGN PATENT DOCUMENTS

JP 9026246 A 1/1997

(Continued)

OTHER PUBLICATIONS

Brochure entitled "ML445 Sensorless BLDC Motor Controller", Fairchild Semiconductor pp. 1-16, (2001).

*Primary Examiner*—Bentsu Ro
(74) *Attorney, Agent, or Firm*—Baker & Daniels

(57) ABSTRACT

A motor control system for a brushless and sensorless DC motor for driving a compressor, pump or other application, includes a protection and fault detection circuit for detecting a locked rotor and a rotor which has stopped because of lost rotor phase lock. The motor control system also includes an off-the-shelf motor control integrated circuit having an input for disabling power outputs to the motor phase coils. The protection and fault detection circuit uses a back EMF sampling circuit coupled to the motor phase coils and momentarily disables power to the motor phase coils, via the motor control integrated circuit input, to determine if the motor rotor is rotating. The system also monitors supply voltage, supply current, temperature, and motor speed limits to detect faults and protect system components.

39 Claims, 22 Drawing Sheets

U.S. PATENT DOCUMENTS

| | | | |
|---|---|---|---|
| 6,046,554 A | 4/2000 | Becerra | 318/254 |
| 6,188,552 B1 | 2/2001 | Jaeschke et al. | |
| 6,215,261 B1 | 4/2001 | Becerra | |
| 6,369,534 B1 | 4/2002 | Menegoli | |
| 6,380,707 B1 | 4/2002 | Rosholm et al. | 318/439 |
| 6,420,847 B1 | 7/2002 | Galbiati et al. | |
| 6,504,328 B1 | 1/2003 | Gontowski, Jr. | |
| 6,900,657 B1 * | 5/2005 | Bui et al. | 324/772 |
| 2003/0017054 A1 | 1/2003 | Odachi et al. | |

FOREIGN PATENT DOCUMENTS

| | | |
|---|---|---|
| JP | 2000328917 A | 11/2000 |
| JP | 2001133330 A | 5/2001 |

* cited by examiner

BRUSHLESS AND SENSORLESS DC MOTOR CONTROL SYSTEM WITH LOCKED AND STOPPED ROTOR DETECTION

CROSS REFERENCE TO RELATED APPLICATION

This application claims the benefit under Title 35, U.S.C. § 119(e) of U.S. Provisional Patent Application Ser. No. 60/442,648, entitled BRUSHLESS AND SENSORLESS DC MOTOR CONTROL SYSTEM WITH LOCKED AND STOPPED ROTOR DETECTION, filed on Jan. 24, 2003.

BACKGROUND OF THE INVENTION

1. Field of the Invention

The present invention relates to DC motor controllers, and, in particular, a motor control system that includes locked and lost rotor detection for a brushless and sensorless DC motor.

2. Description of the Related Art

For certain electric motor applications, such as driving a compressor or a pump, using DC motors is generally more advantageous then using AC motors. For example, compressor start-up requires a high torque at low speed start-up, which typically cannot be managed well by AC motors, especially AC motors having open loop controllers. Additionally, at lower compressor loads, the compressor may be more efficiently run at lower speeds. Typically, DC motors handle variable speed and high torque, low speed applications more effectively than do AC motors and control systems.

Therefore, in applications requiring high torque, low speed operation, a variable speed DC motor is generally used, particularly a brushless DC (BLDC) motor. However, one difficulty with using a BLDC motor is detecting a locked motor rotor, such as from motor bearing failure or debris blocking movement or damaging the phase coils. Another difficulty is detecting a rotor stopped from the loss of rotor phase lock, which the motor controller requires for proper electronic commutation of the phase coils in a BLDC motor.

While many applications use a rotor position sensor for maintaining rotor phase lock or for detecting a locked rotor, space and environmental considerations in sealed applications, such as pumps or compressors, limit the use of such a sensor. For example, a hermetically sealed compressor generally includes lubricant and refrigerant which, when heated by compressor operation and exposed to moisture, can form an acid that is corrosive to sensors. Also, if a motor sensor is used, additional electrical connections must be carried through the wall of the hermetically sealed chamber without compromising the hermetic sealing, adding further expense and an additional possible point of failure of the hermetic seal.

One common solution to detecting a locked or stopped rotor in electric motor applications is sensing a motor current drawn by the motor coils that is higher than the normal current of a running motor. For example, a locked rotor condition in a typical nonvariable electric motor may cause the motor current to exceed 80 amps, while normal high-speed motor operation only requires 10 to 15 amps. However, in the case of a BLDC motor, a locked or stopped rotor condition may draw less current than normal running current, for example, 30 amps for a stopped rotor, while normal high RPM operation may draw 40 amps. Thus, conventional over-current sensing detection does not provide a solution for detecting a locked or stopped rotor.

In compressor applications, in addition to bearing failure, debris, or lost rotor lock, another typical problem that may cause a BLDC motor to not run properly is an attempt to restart the motor shortly after compressor shutdown. After shutdown, the refrigerant head pressure of the compressor may provide more resistance than the available torque of the electric motor can overcome, thus causing a temporary locked rotor condition. Over time, head pressure eventually equalizes throughout the system, freeing the motor and compressor to again operate normally.

What is needed is a BLDC motor controller that provides locked and stopped rotor detection without the use of a rotor position sensor or over-current detection.

BRIEF SUMMARY OF THE INVENTION

The present invention provides a method and a motor control system for detecting a locked or stopped rotor for a brushless and sensorless DC motor system, including for example a compressor, pump, or other application, for example, detecting a locked or stopped actuator for a valve or solenoid drive. The motor control system includes a protection and fault detection circuit capable of sampling back electromotive force (EMF) and a motor control circuit having an off-the-shelf motor control integrated circuit (IC). The protection and fault detection circuit momentarily disables the motor control IC phase driver outputs by providing an over-current indication to the motor control IC. While the phase driver outputs are disabled, back EMF is generated by the motor if the motor rotor is still rotating. Thus, after disabling the phase driver outputs, the fault detection circuit measures back EMF to determine if the motor rotor is rotating or stopped.

Although the exemplary embodiment is directed to a brushless DC (BLDC) motor used to drive a sealed compressor or pump not having a sensor, the inventive concept could also be applied to other types of motors and applications, for example, unsealed pumps, valves, or solenoid drives. In BLDC motor applications without a rotor position or other sensor, it is difficult to determine that the motor rotor has locked or that electronic commutation phase lock with the rotor has been lost by the motor control circuit, resulting in a stopped rotor.

Back EMF detection is accomplished by momentarily disabling the phase coil driver outputs of the motor control IC. The driver outputs may be disabled by providing a signal to an available control input of the motor control IC. For example, providing a signal to a current overload control input, thereby simulating an over-current condition and momentarily shutting down the motor control IC phase driver outputs. During the brief time in which the motor phase coils are not being electrically driven, a back EMF sampling circuit measures the back EMF to determine whether the rotor is still in rotation. Back EMF is generated in the undriven phase coils by the movement of the motor's magnets past the phase coils. The duration of momentarily disabling the driver outputs is of sufficient duration to allow at least one magnet to pass by a phase coil at the lowest motor speed, yet of insufficient duration to substantially effect motor speed and torque, for example about 1.0 msec. If a threshold level of back EMF is detected, the signal state provided to the control input, for example simulating an over-current condition, is switched and the motor control IC will resume powering the motor. If the threshold level of back EMF is not detected, then the protection and fault detection circuit can, after a preset delay, attempt a series of motor restarts using the motor control IC.

The protection and fault detection circuit, which includes the back EMF sampling circuit, may include opto-isolators for isolating the high phase coil voltage from the detection circuit. In the exemplary embodiment, the circuit includes a capacitor for collecting the back EMF to be detected, and a microcontroller having an analog-to-digital converter for measuring the back EMF, and for controlling the back EMF sampling process, and for handling faults and system protection measures. For example, fault handling and system protection measures may include attempting to restart the system, operating the system in a backup mode, or shutting the system down.

The inventive motor control may also be capable of detecting other faults, for example, excessive or insufficient motor voltage, excessive or insufficient motor current, excessive power bridge circuit, motor, or compressor temperature, and excessive or insufficient motor speed. The inventive motor control may also provide protective and diagnostic features which are capable of preventing damage to the motor control, motor, and related components and systems, and which also provide determination of the underlying cause of the fault based on detected parameters and the result of restart or other corrective or diagnostic fault handling steps.

One advantage of the BLDC motor control locked and stopped detector is that rotor detection is provided without requiring a rotor position or speed sensor or relying on an over-current detection circuit. Another advantage of the present invention is that a commercially available, off-the-shelf motor control IC having a control input, for example, a current overload input port, may be utilized for switching on and off the driving of the phase coils and for most other aspects of motor control. Therefore, the present invention provides easy interfacing with existing motor control systems and motor control ICs. Yet another advantage of the present invention is that the fault detection circuit may include a microcontroller that is enabled by software, thus modifications to parameters and the control method can be easily made without hardware changes.

In one form, the present invention provides a motor control system for controlling a brushless and sensorless DC motor system having a plurality of phase coils, including: a motor control integrated circuit having a plurality of motor driver outputs and a control input for operating the plurality of output drivers, the plurality of motor driver outputs coupled to the plurality of phase coils; and a fault detection circuit coupled with the control input and capable of electively switching the state of said control signal to momentarily disable said plurality of out put drivers, said fault detection circuit is coupled to at least one of the plurality of phase coils and is capable of detecting a threshold back EMF voltage from the at least one of the plurality of phase coils.

In another form, the present invention provides a motor control system for controlling a brushless and sensorless DC motor system having a plurality of phase coils, including: a motor control integrated circuit having a plurality of motor driver outputs and a control input for operating the plurality of output drivers, said plurality of motor driver outputs coupled to the plurality of phase coils; and a fault detection circuit coupled with the control input and capable of detecting a plurality of electrical and nonelectrical fault conditions of the motor system, the fault detection circuit capable of providing a control signal to the control input to disable the plurality of output drivers upon detection of at least one of the plurality of electrical and nonelectrical fault conditions.

In another form, the present invention provides a method for detecting faults in a motor control system for a brushless and sensorless DC motor system having a plurality of phase coils, including the steps of: providing a motor control integrated circuit having a plurality of power drivers coupled to the plurality of phase coils, and having a control input capable of selectively enabling the plurality of power drivers; detecting a motor system fault by measuring EMF on at least on of the plurailty of phase coils; and switching the control input to disable the plurality of power drivers upon detecting a motor system fault, indicated by measured EMF below a present threshold thereby stopping motor operation.

In yet another form, the present invention provides a method for detecting a locked or stopped rotor in a motor control system for a brushless and sensorless DC motor system having a plurality of phase coils driven by power drivers, including the steps of: disabling the power drivers; then measuring the back EMF generated from the plurality of phase coils; and then enabling the power drivers after a time period dependent on the measured back EMF.

In another form, the present invention provides a fluid handling system, including: a pump; a brushless DC motor for driving the pump, the motor having a plurality of phase coils; and a motor control system coupled to the motor, the motor controller system including: a motor control circuit having at least one motor driver output coupled to the plurality of phase coils; and a microcontroller having an A/D converter coupled to at least one of the plurality of phase coils and having software enabling the micocontroller to provide an output signal coupled to the motor control circuit momentarily disabling the at least one motor driver output, the microcontroller capable of measuring a voltage level of back EMF generated in at least one of the plurality of phase coils upon the at least one motor driver output being disabled.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplary embodiment of the invention illustrated herein is not to be construed as limiting the scope of the invention in any manner.

DETAILED DESCRIPTION

Figure 1:
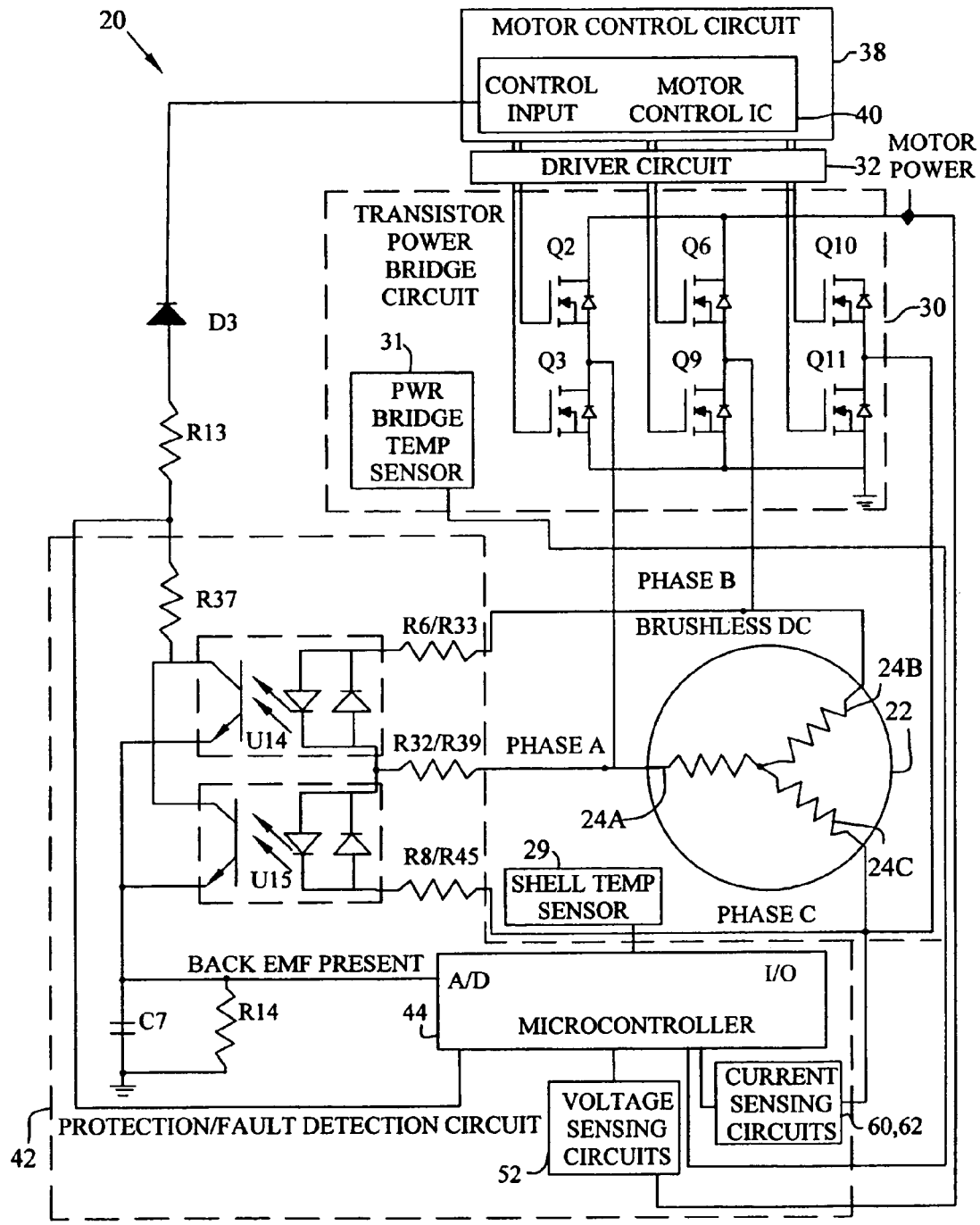
FIG. 1 is a block diagram of a motor control system having a locked and stopped rotor detector according to the present invention.

The present invention comprises a motor control system for controlling a brushless DC (BLDC) motor. Motor control system 20 is capable of detecting a locked or stopped rotor 26 without a rotor position or speed sensor. As depicted in FIG. 1, the exemplary embodiment of motor control system 20 generally includes electric motor 22, transistor power bridge circuit 30, phase driver circuit 32, motor control circuit 38, and protection/fault detection circuit 42.

Electric motor 22 in the exemplary embodiment is a BLDC motor having three phase coils, phase A 24a, phase B 24b, and phase C 24c. The plurality of phase coils 24a–24c are driven by transistor power bridge circuit 30, including phase source driving FETs Q2, Q6, and Q10, and phase sink driving FETs Q3, Q9, and Q11.

Transistor power bridge circuit 30 is controlled by motor control circuit 38, including motor control IC 40, which may be a commercially available, off-the-shelf motor control IC having a control input for selectively enabling or disabling phase driver outputs. For example, the control input may be a port for disabling the phase driver outputs in the event of a current overload.

In the exemplary embodiment, motor control IC 40 provides aspects of motor control, including start-up, phase locked electronic commutation, and speed detection for motor 22. Electronic commutation is provided by sensorless phase detection, for example, by detecting signal zero crossing for the undriven phase. Motor control IC 40 may be a variable speed motor controller capable of handling the high torque and low to high speed ramping required for operating compressors, pumps, and such. Motor control IC 40 includes a control input for selectively enabling and disabling the driving of transistor power bridge circuit 30. Power bridge circuit 30 powers phase coils 24a–24c of motor 22. Therefore, switching the control input selectively enables and disables power of phase coils 24a–24c. In the exemplary embodiment, the control input state may be momentarily switched for back EMF detection and also switched to disable motor 22 in the event a fault requiring system protection is detected.

Fault detection circuit 42 includes optically coupled isolators U14 and U15 for coupling phase coils 24a, 24b, and 24c to back EMF sensing capacitor C7. Microcontroller 44 provides control and locked and stopped rotor detection by selectively driving the control input of motor control IC 40 to its enabled state and measuring back EMF across capacitor C7.

Additional fault detection and system protection features may be included in the present invention. For example, the exemplary embodiment of motor controller 20 includes several other fault detection devices coupled to protection circuit 42. Shell temperature sensor 29 may be thermally coupled to motor 22 or compressor 28 for detecting an over-temperature condition. Power bridge temperature sensor 31 may be thermally coupled to transistor power bridge 30 for detecting over-temperature of transistors Q2, Q3, Q6, Q9, Q10, and Q11. Voltage sensing circuit 52 may be coupled to power supply 34 for sensing a voltage supply level that is over or under preset thresholds. Current sensing circuits 60 and 62 may be coupled to at least one phase coil 24a–24c for sensing a motor supply current above or below preset thresholds. Advantageously, microcontroller 44 may not only detect faults, but may also perform protection and diagnostic functions. For example, microcontroller 44 may shut down motor 22 after detecting a preset number of faults or the fault continuing for more than a preset time. Additionally, by detecting the fault type or the combination of faults and whether resuming normal functioning of motor 22, if attempted, was successful, microcontroller 44 may indicate the likely underlying source of the fault condition. For example, microcontroller 44 may include a look-up table (not shown) in order to perform such diagnostic functions.

Figure 2:
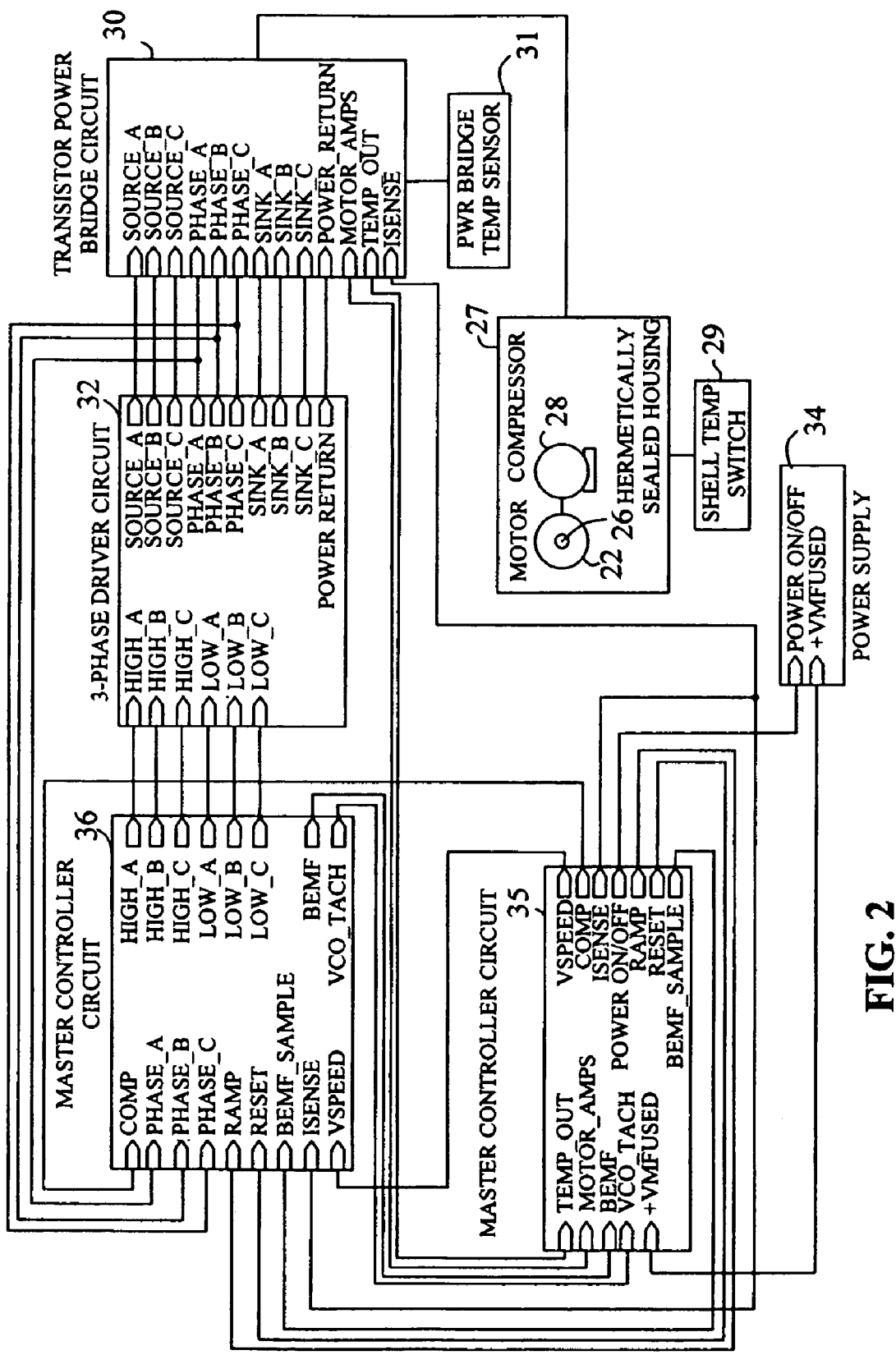
FIG. 2 is a schematic block diagram of a portion of the motor control system of FIG. 1.

Referring to FIG. 2, a block diagram of exemplary motor control system 20 is shown powering motor 22, which drives compressor 28. Motor 22 and compressor 28 are hermetically sealed in housing 27 and may be, for example, part of a refrigeration system. Although the load driven by motor 22 in the exemplary embodiment is a compressor, the present invention can be used to control a motor or other electrical actuator driving a wide range of loads, for example, fluid pumps, such as liquid and gas, valves, etc. In the exemplary embodiment, low current phase drivers 32 are coupled to motor control circuit 38 and provide reference signals for transistor power bridge circuit 30. Power for motor control system 20 is provided by switching power supply 34.

Figure 7A:
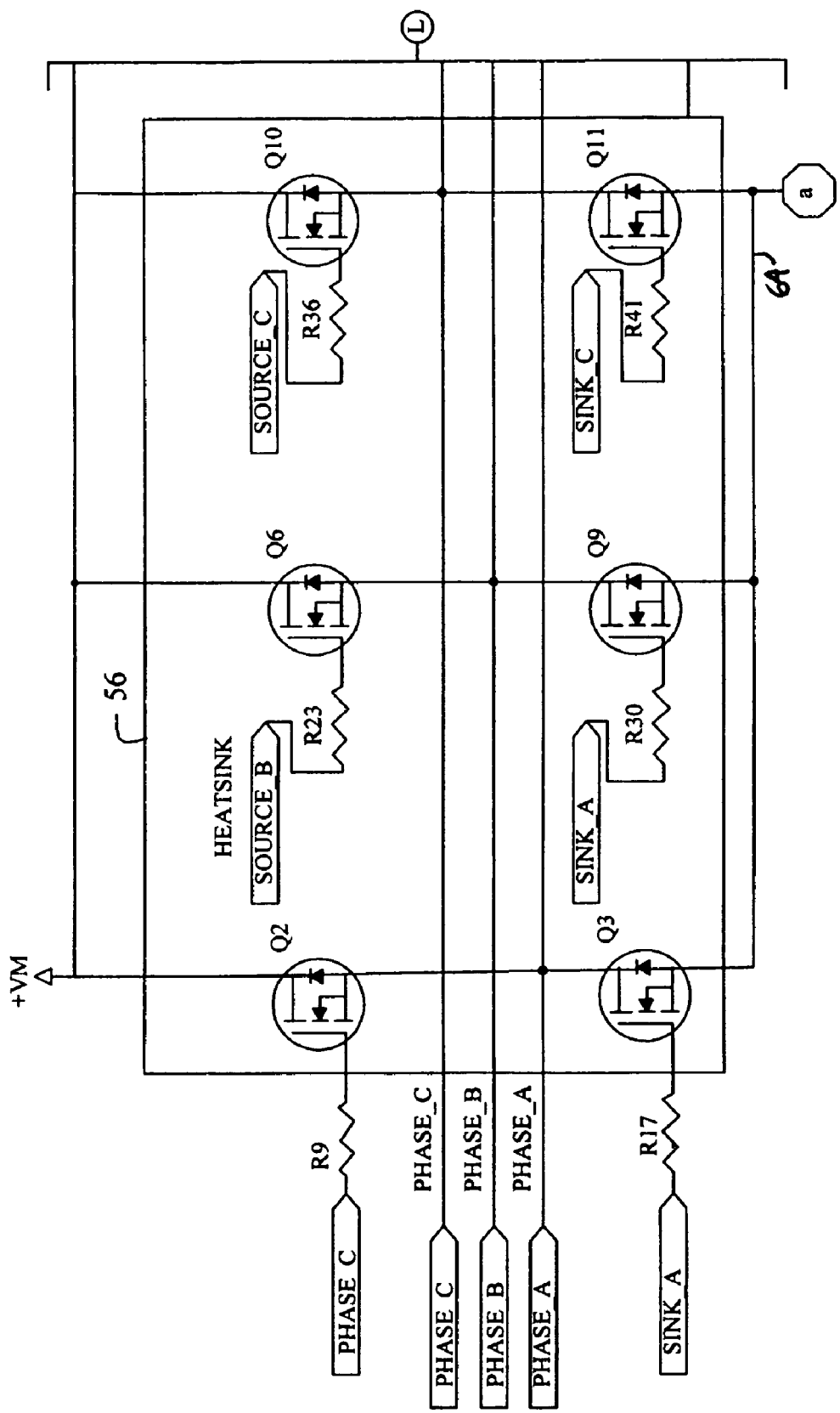
FIGS. 7A–7B are schematic diagrams and plan view of a portion of the motor control system of FIG. 1 including a transistor power bridge circuit.

System protection elements include power bridge temperature sensor 31 and shell temperature sensor 29. Power bridge temperature sensor 31 is thermally coupled to the high-power components of transistor power bridge circuit 30, for example, thermally mounted to heat sink 56 (FIG. 7A). Power bridge temperature sensor 31 is electrically coupled to microcontroller 44, thereby providing thermal monitoring and motor shutdown capability in the event transistor power bridge circuit 30 overheats. Similarly, shell temperature sensor 29 is thermally coupled to at least one of motor 22 and compressor 28, for example, thermally mounted to housing 27. Shell temperature sensor 29, for example a bimetal switch, is similarly coupled to microcontroller 44, thereby providing thermal monitoring and motor 22 shutdown capability in the event of motor 22 or compressor 28 reaching an operating temperature that may cause system damage.

Figure 3A:
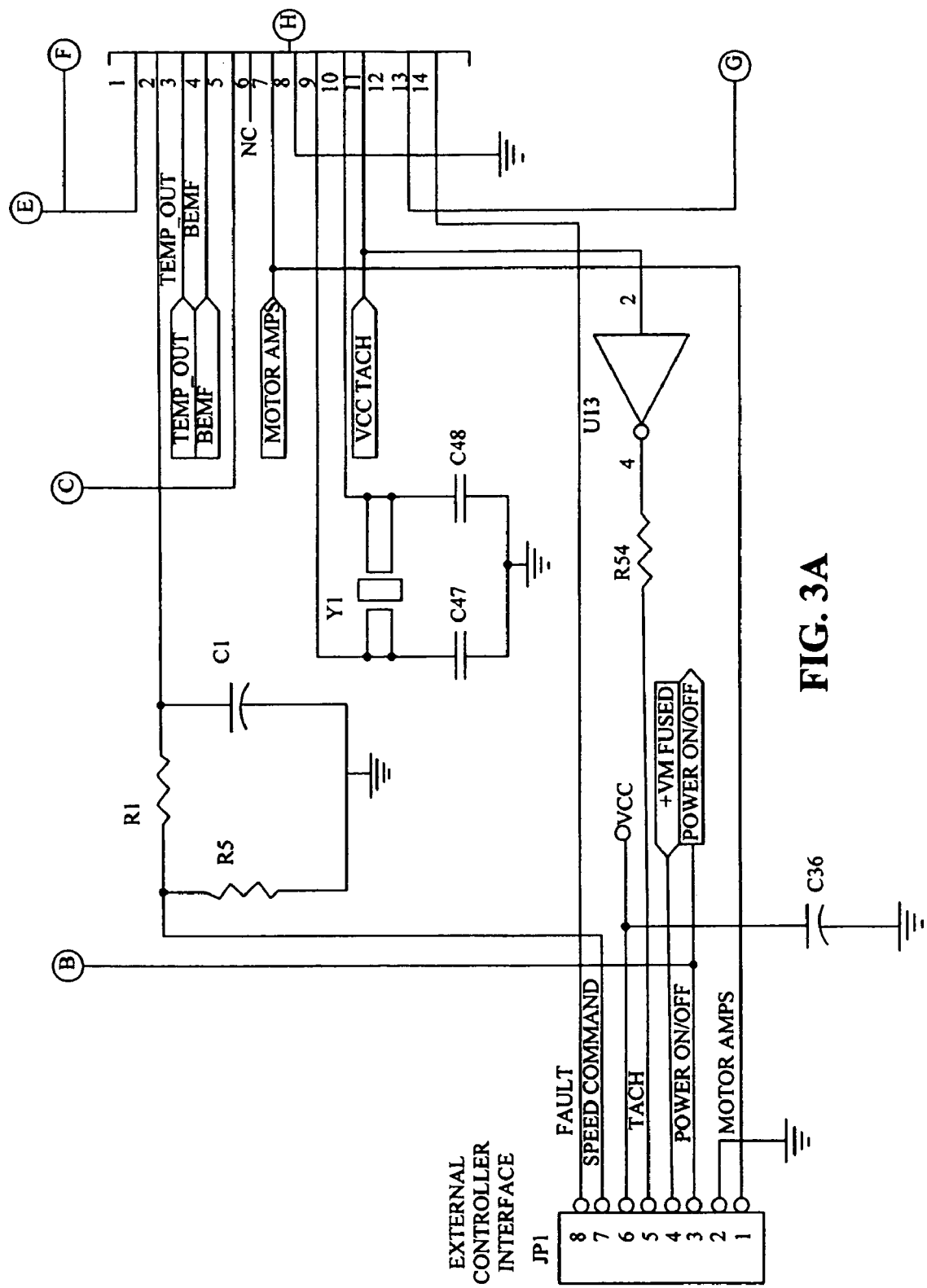
FIGS. 3A–3C are schematic diagrams of a portion of the motor control system of FIG. 1 including the protection and fault detection circuit.
Figure 3B:
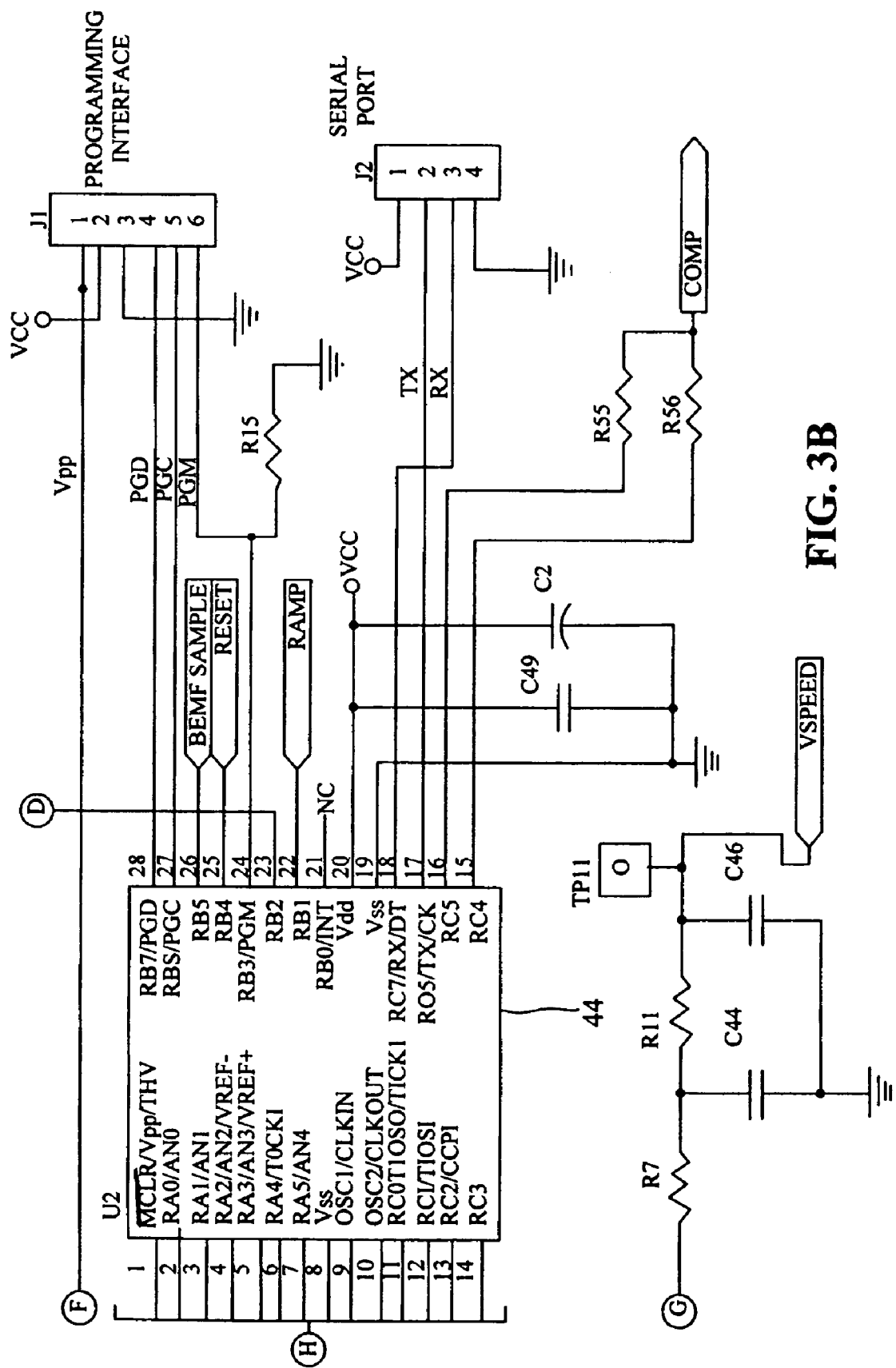
Figure 3C:
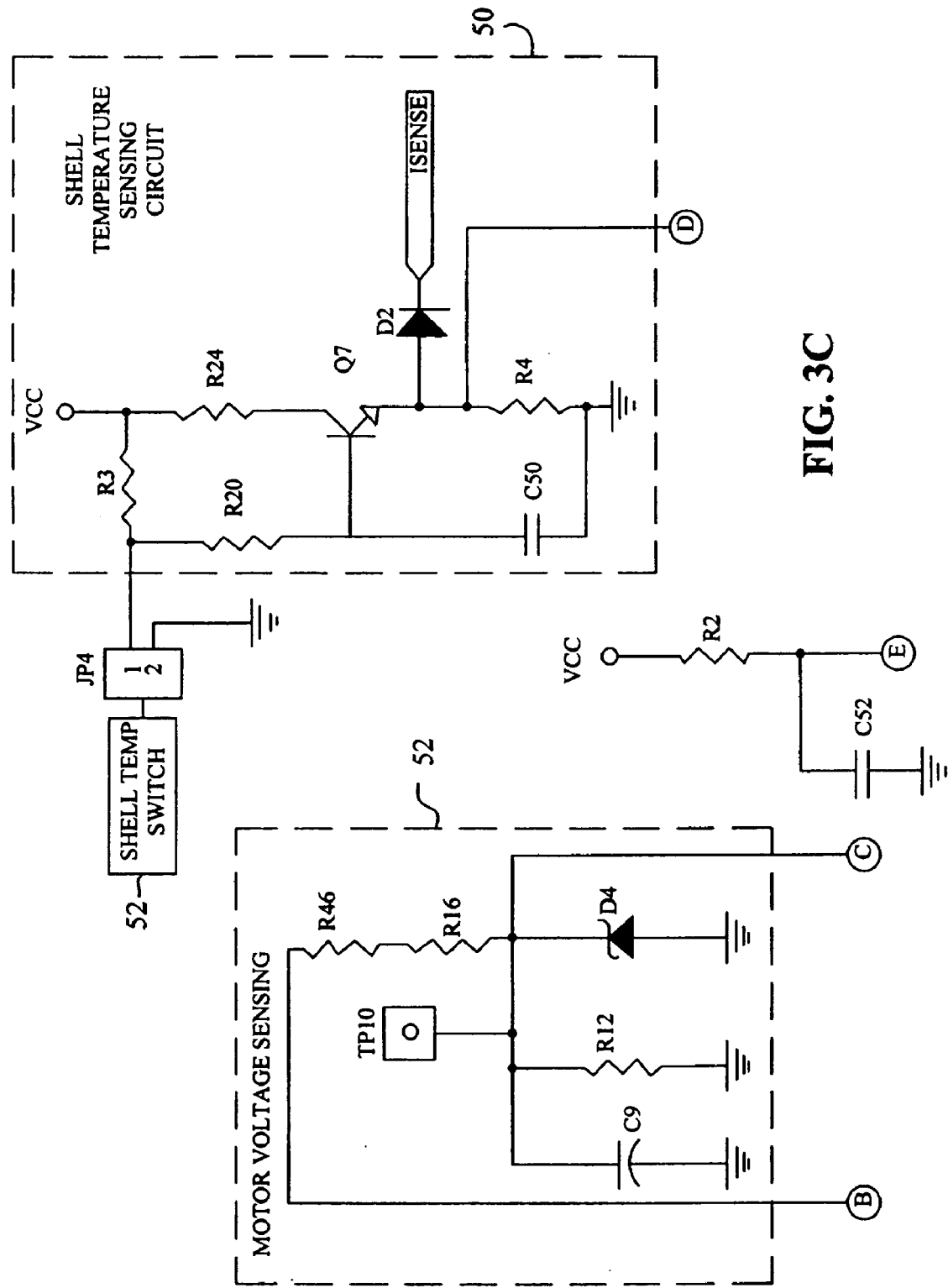
Figure 4A:
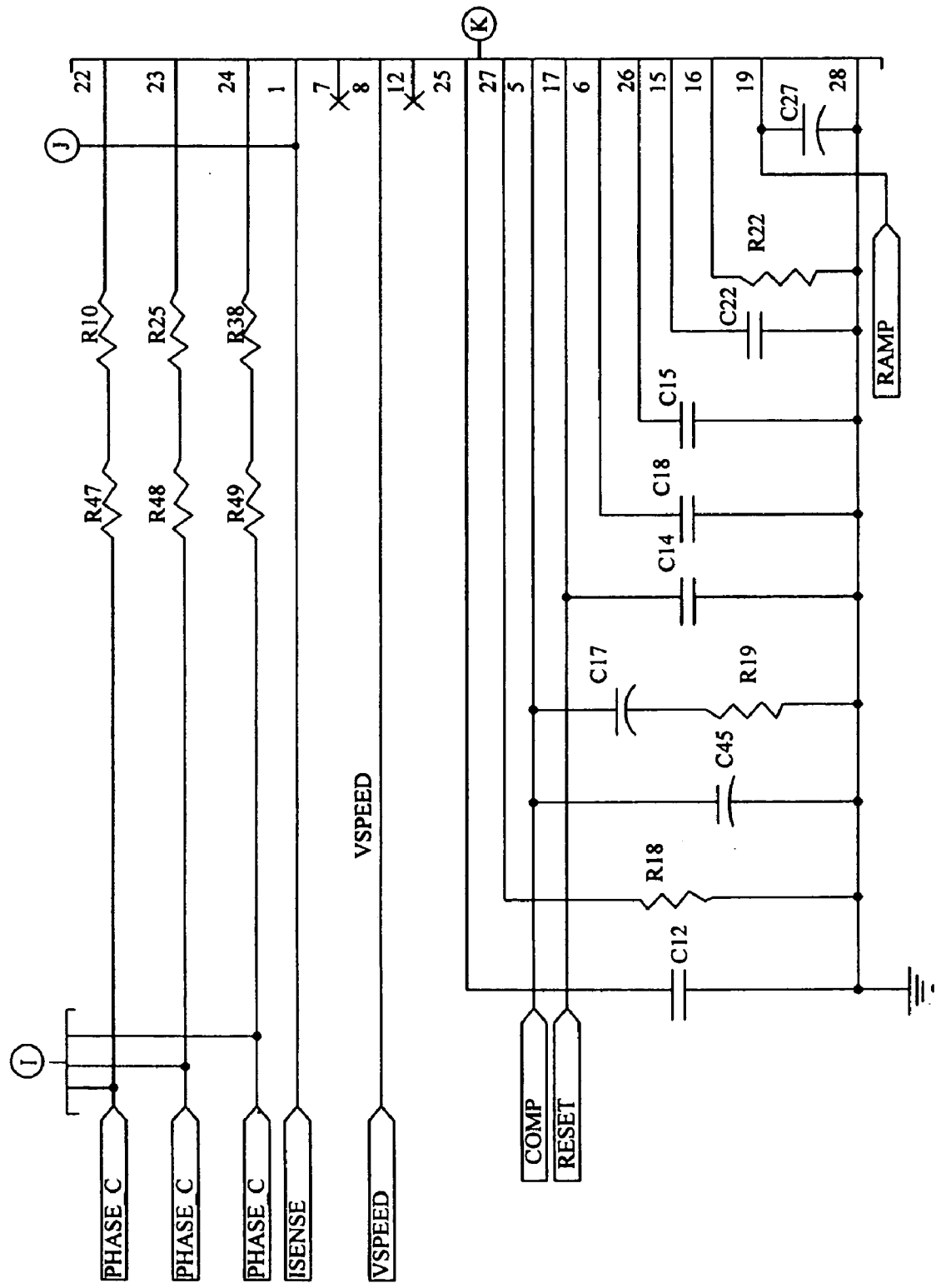
FIGS. 4A–4C are schematic diagrams of a portion of the motor control system of FIG. 1 including the motor control integrated circuit.
Figure 4B:
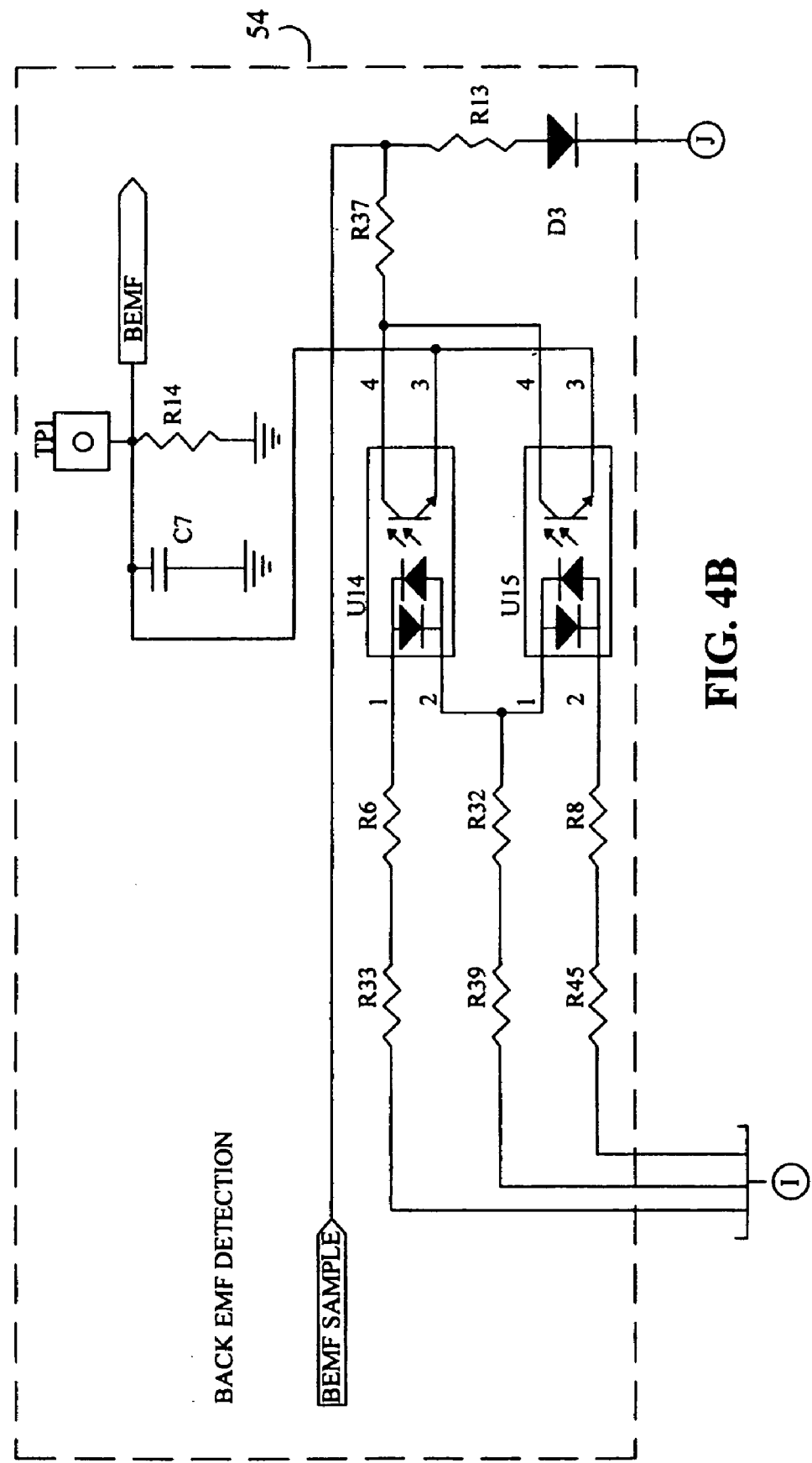

Referring to FIGS. 3A–3C, protection/fault detection circuit 42 includes microcontroller 44, which includes input and output (IO) ports, analog-to-digital (A/D) converters, and software for controlling fault detection, diagnostic functions, system protection, and motor shutdown; power bridge temperature detection sensor 31 (FIG. 7B); motor voltage sensing circuit 52; and back EMF detection circuit 54 (FIG. 4B).

Microcontroller 44 includes software for measuring various motor conditions, detecting faults, making diagnostic determinations, and providing system protection to stop, restart, or shut down motor 22 by providing a control input to motor control IC 40. Specifically, microcontroller 44 receives +5 V DC power at pin 1, circuit ground at pin 8, a back EMF signal from detection circuit 54 (FIG. 4B) at pin 4, motor supply current from motor current sensing amp 60 (FIG. 8) at pin 7, motor supply voltage from motor voltage sensing circuit 52 at pin 5, motor speed from motor control IC 40 at pin 11, shell temperature fault detection at pin 23, and temperature measurement from power bridge temperature sensor 31 at pin 3. Additionally, microcontroller 44 provides IO ports at pin 26 for disabling the phase driver output of motor control IC 40, at pin 14 for fault indication output, at pin 22 to select ramp mode of motor control IC 40, at pin 25 to reset motor control IC 40, at pin 13 to provide speed signal VSPEED to motor control IC 40, and at pins 15 and 16 for pre-motor start charging of network motor compensation capacitors C17 and C45.

Microcontroller 44 may be, for example, Part No. 16F870 available from Microchip Technology Inc. of Chandler, Ariz. Microcontroller 44 is enabled by software, such as represented by the flowcharts of FIGS. 10A–10G. Alternatively, microcontroller 44 may alternatively comprise an alternative logic processing device, such as a microprocessor, digital signal processor, or discrete circuitry.

Figure 7B:
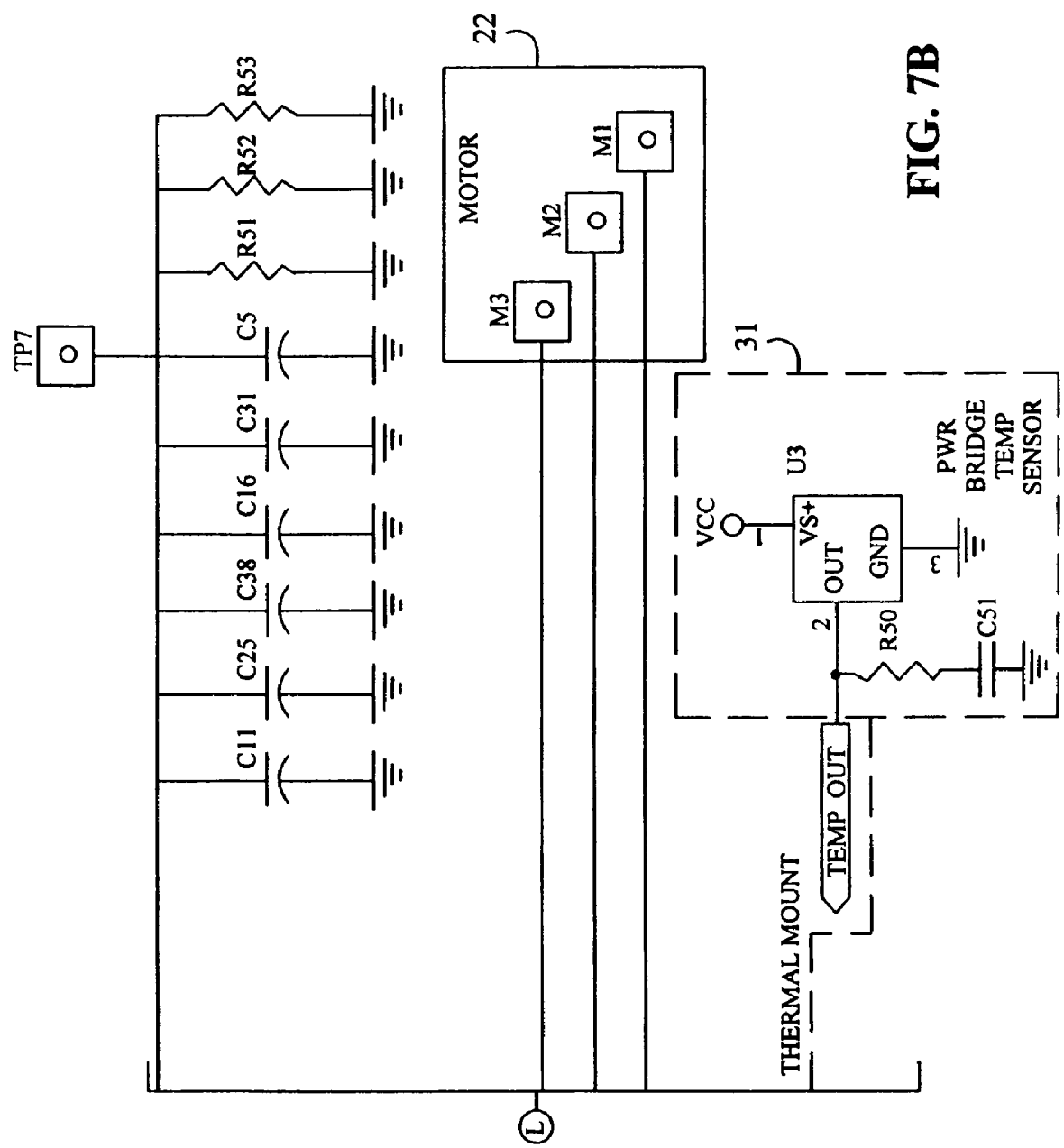

Pin 3 of microcontroller 44 is an A/D converter input port which receives temperature signal TEMP_OUT from power bridge temperature sensor circuit 31 (FIG. 7B). Referring to FIG. 7B, power bridge temperature detection circuit 31 receives a temperature signal from pin 2 of temperature sensor U3, which is thermally coupled to, power bridge FETs Q2, Q3, Q6, Q9, Q10, and Q11. For example, sensor U3 maybe mounted on heat sink 56. Temperature sensor U3 may be, for example, Part No. LM34TH, a precision Fahrenheit temperature sensor providing a linear millivolt signal proportional to degrees Fahrenheit, available from National Semiconductor of Santa Clara, Calif.

Referring again to FIGS. 3A and 3B, temperature signal TEMP-OUT from temperature sensor U3 is provided to the input pin 3 and shell temperature sensing circuit 50 is coupled to pin 23 of microcontroller 44. Therefore, when the temperature of heat sink 56 measured by temperature sensor U3 exceeds a preset limit determined by microcontroller 44, protective measures, such as temporary shutdown of motor 22 may be executed by microcontroller 44.

Shell temperature sensor 29 may be coupled by connector JP4 to shell temperature sensing circuit 50, including resistors R3, R4, R20, and R24, transistor Q7, capacitor C50, and diode D2. Upon activation of shell temperature sensor 29, shell temperature sensing circuit 50 switches on transistor Q7, providing a signal through diode D2 for driving ISENSE control input pin 1 of motor control IC 40 (FIG. 4C) to a high logic state to disable the phase driver outputs. A signal is also provided by Q7 for driving temperature fault IO pin 23 of microcontroller 44 to a high logic state to indicate an over-temperature fault.

When such a temperature fault is detected by microcontroller 44, and when other faults are detected, microcontroller 44 may provide a fault output signal at pin 14 indicating a fault condition via pin 8 of external controller interface JP1. In addition, microcontroller 44 may stop motor 22 by providing an active high output signal at motor disable output pin 26 of microcontroller 44, which is coupled with ISENSE input pin 1 of motor controller IC 40, thus disabling the phase driver outputs of motor control IC 40.

Motor voltage sensing circuit 52 includes resistors R46, R16, and R12 that divide the motor supply voltage and are coupled with microcontroller 44 pin 5. Additionally, zener diode D4 protects microcontroller 44 from damaging levels of voltage. Motor voltage input pin 5 is an A/D converter that measures the motor supply voltage and can detect an over-voltage or an under-voltage condition. Microcontroller 44 may shut down motor 22 in an over-voltage condition to prevent damage to motor 22, motor control system 20, or other connected system components. Microcontroller 44 may also shut down motor 22 in the event of an under-voltage condition, for example, for battery-driven systems so that remaining battery power is available for monitoring and controlling functions and not entirely expended by driving motor 22.

Figure 8:
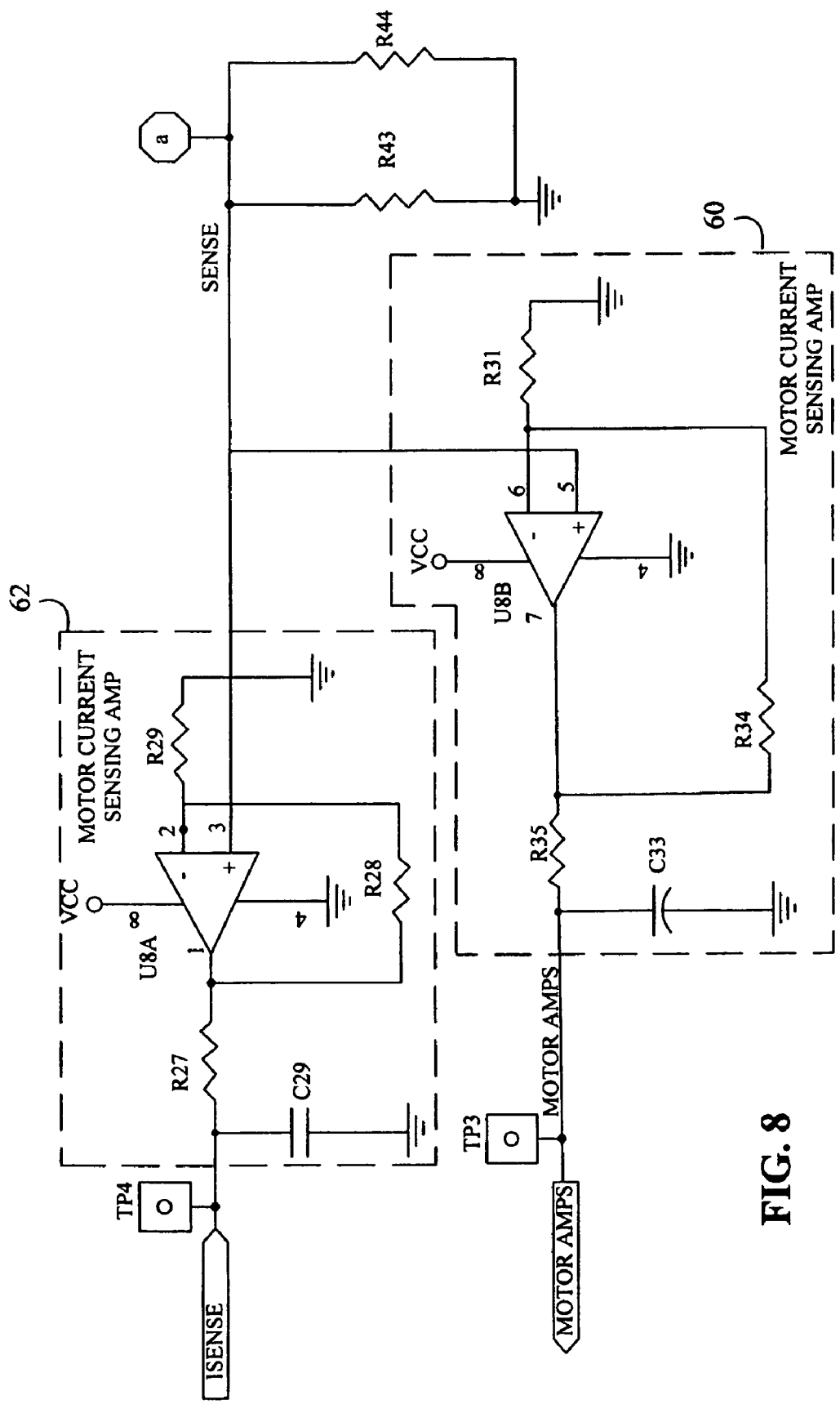
FIG. 8 is a schematic diagram of a portion of the motor control system of FIG. 1 including motor current sensing amplifiers.

Motor current input pin 7 of microcontroller 44 is an A/D converter that may be configured to provide current sensing over or under preset limits. Referring to FIG. 8, motor current sensing amplifier 60 receives a 0.25 mV/A signal from circuit node 64 (FIG. 7B) between the source terminals of phase driver sink FETs Q3, Q9, and Q11 and low resistance, high power resistors R43 and R44, which are connected to ground. Op amp U8B amplifies the signal and is configured for a fixed gain of 50, which scales the signal to utilize the 5 volt range of microcontroller 44 A/D converter at pin 7. By monitoring motor current, microcontroller 44 can detect failure modes other than a locked or stopped rotor, such as a short in phase coils 24a–24c.

Referring again to FIG. 3B, pin 4 of microcontroller 44 is an A/D converter for measuring motor back EMF, which is generated across capacitor C7 (FIG. 4B) by phase coils 24a–24c during a periodic sampling controlled by microcontroller 44. During periodic sampling of back EMF, motor control IC 40 momentarily disables the phase driver outputs at pins 2–4 and 9–11 (FIG. 4C) of motor controller IC 40 so that phase coils 24a–24c operate as a generator if rotor 26 (FIG. 2) of motor 22 is still in rotation relative to the motor stator windings, i.e., the phase coils 24a–24c. The phase driver outputs are disabled by motor disable output pin 26 of microcontroller 44, which is coupled through resistor R13 and diode D3 (FIG. 4B), driving ISENSE control input pin 1 of motor control IC 40 to a high logic state.

As shown in FIG. 4B, back EMF detection circuit 54 includes optically coupled isolators U14 and U15, which are connected through resistors R6, R8, R32, R33, R39, and R45 to motor phases coils 24a–24c. Motor disable output pin 26 of microcontroller 44 also provides a supply voltage to the output transistors of optically coupled isolators U14 and U15. The output transistors of U14 and U15 charge capacitor C7 when they are excited by the LEDs. The LEDs are internal to U14 and U15, and are powered by back EMF received from motor 22 phase coils 24a–24c. Optically coupled isolators U14 and U15 maybe, for example, Part No. PS2505-1 manufactured by NEC Corporation of Melville, N.Y.

Figure 4C:
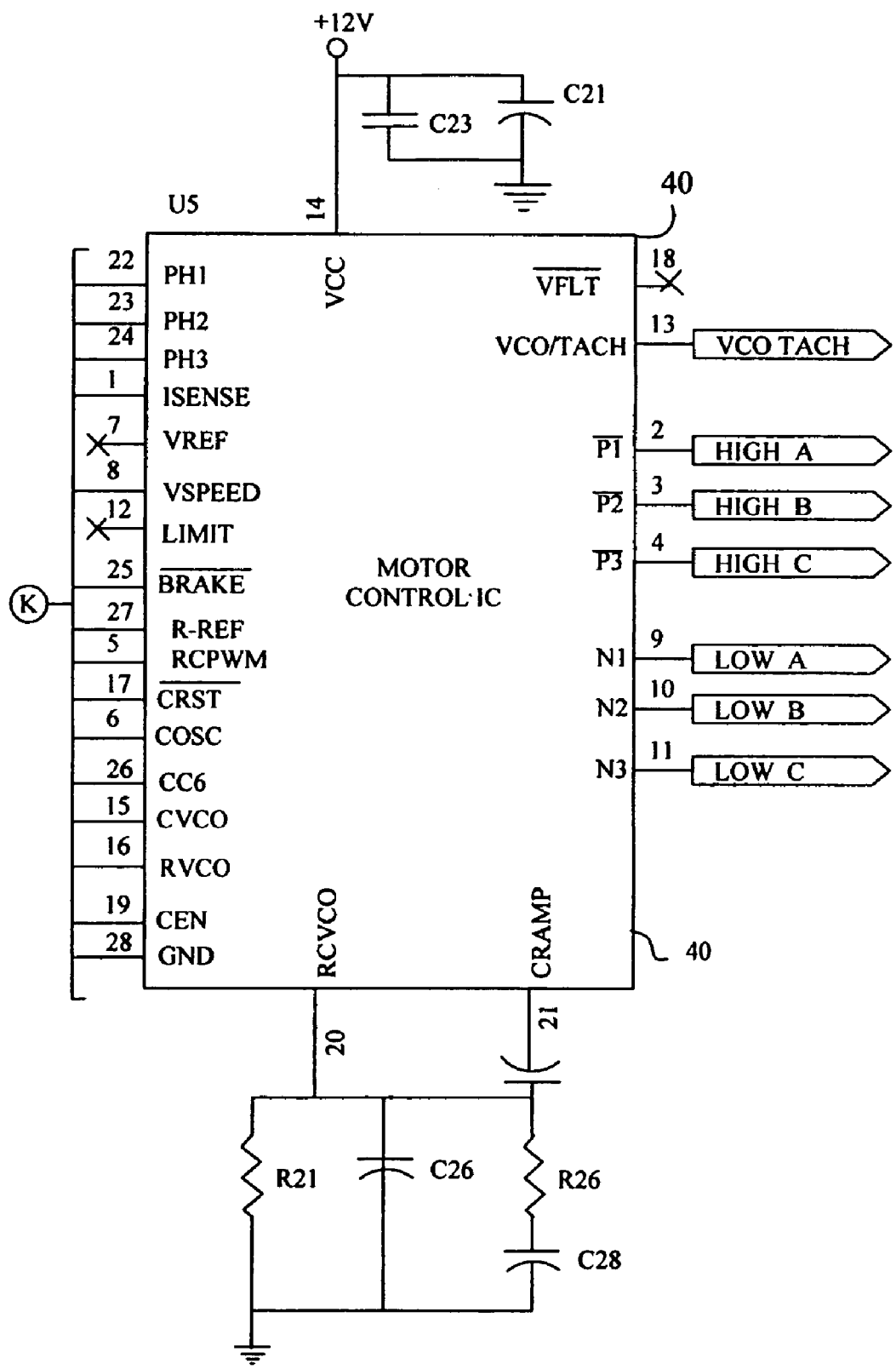

The exemplary embodiment motor control circuit 38 for controlling motor 22 is primarily implemented by motor control IC 40, such as Part No. ML4425CS available from Fairchild Semiconductor Corporation of South Portland, Me. Motor control IC 40 provides pulse width modulated (PWM) ramp and speed control for BLDC motor 22. As shown in FIGS. 4A and 4C, motor control IC 40 requires a number of associated components that are selected based on the motor type, voltage, application, etc., and in accordance with the manufacturer's specifications. The run speed of motor 22 is determined by a speed signal provided through external control interface JP1 pin 7, shown in FIG. 3A, and received by A/D converter input pin 2 of microcontroller 44. Resistors R1 and R5 and capacitor C1, also shown in FIG. 3A, condition the speed signal. Based on this signal and control and protection logic of microcontroller 44, IO port pin 13 of microcontroller 44 provides speed command signal VSPEED, conditioned by resistors R7 and R11 and capacitors C44 and C46, to pin 8 of motor control IC 40.

To determine phase commutation, motor control IC 40 uses back EMF detection on the undriven phase coil 24a–24c received through pins 22–24, shown in FIGS. 4A and 4C. Motor control IC 40 drives phase driver outputs pins 2–4 and 9–11 to power motor phase coils 24a–24c in a sequence providing phase locked loop (PLL) electronic commutation of motor 22, and ramping up to a motor run speed determined by the speed command signal VSPEED received at pin 8. Pin 13 provides speed feedback signal VCO/TACH to external controller interface JP1 pin 5, shown in FIG. 3A, and to IO port pin 11 of microcontroller 44, based on the PLL commutation of motor controller IC 40.

By monitoring the speed of motor 22, microcontroller 44 may determine if the motor speed is under a minimum preset motor speed or over a maximum preset motor speed. For example, the inventors have realized that in hermetically sealed compressor applications such as the exemplary embodiment, motor RPM of less than a preset minimum speed determined for each compressor application is insufficient to properly lubricate compressor 28, for example, less than 1500 RPM. Therefore, if a fault condition causes motor 22 to fall below the preset speed for a preset period of time, microcontroller 44 can flag a fault condition and shut motor 22 down. Similarly, the inventors have realized that operation of motor 22 at an RPM of over a preset maximum speed may cause damage to valve components of compressor 28, for example, over 6500 RPM. Similarly, the over-speed fault can be determined and operation of motor 22 stopped to prevent system damage.

Referring to FIG. 4, three sources provide logic inputs to ISENSE control input pin 1 of motor control IC 40. Motor disable output pin 26 of microcontroller 44 drives motor current overload ISENSE input pin 1 of motor control IC 40 to a high logic state for periodic sampling of motor 22 back EMF in order to detect a locked or stopped rotor. In the exemplary embodiment, periodic sampling includes driving ISENSE pin 1 high for about 1.0 msec, about once each second, for example, to detect whether the rotor of motor 22 has stopped due to a locked or stopped rotor condition. Under normal operating conditions, the running of motor 22 will provide back EMF, which charges capacitor C7 and, after a preset delay, for example, about 0.9 msec., is measured by back EMF A/D converter at pin 4 of microcontroller 44, shown in FIGS. 3A and 3B. In the event of a locked or stopped rotor, back EMF will not be generated by phase coils 24a–24c and capacitor C7 will not be charged, so voltage below a preset motor running threshold will be detected at pin 4. Microcontroller 44 may then provide a control signal to motor current overload ISENSE pin 1 of motor control IC 40 and provide a fault output signal at pin 4 of microcontroller 44.

An input signal to motor current overload ISENSE pin 1 of motor control IC 40 is also provided by shell temperature sensor circuit 50, shown in FIG. 3C, which drives ISENSE pin 1 to a high state in the event shell temperature switch 29 opens, removing continuity to ground and allowing pin 1 to float to 5V, for example, by the opening of bimetal switch 29 in the event of an over-temperature condition.

A control signal coupled to ISENSE pin 1 of motor control IC 40 may also be provided by motor current sensing amplifier 62 shown in FIG. 8. Motor current sensing amplifier 62 receives and amplifies a 0.25 mV/A signal across current sense resistors R43 and R44 and from the source terminals of sink FETs Q3, Q9, and Q11 of transistor power bridge circuit 30. Motor current sensing amplifier 62 provides a signal gain of 5 and is coupled to ISENSE pin 1 of motor control IC 40. The signal gain of amplifier 62 is selected to provide quick ISENSE pin 1 signal switching to prevent damage to power bridge circuit 30 in the event motor current exceeds a preset threshold.

Figure 5:
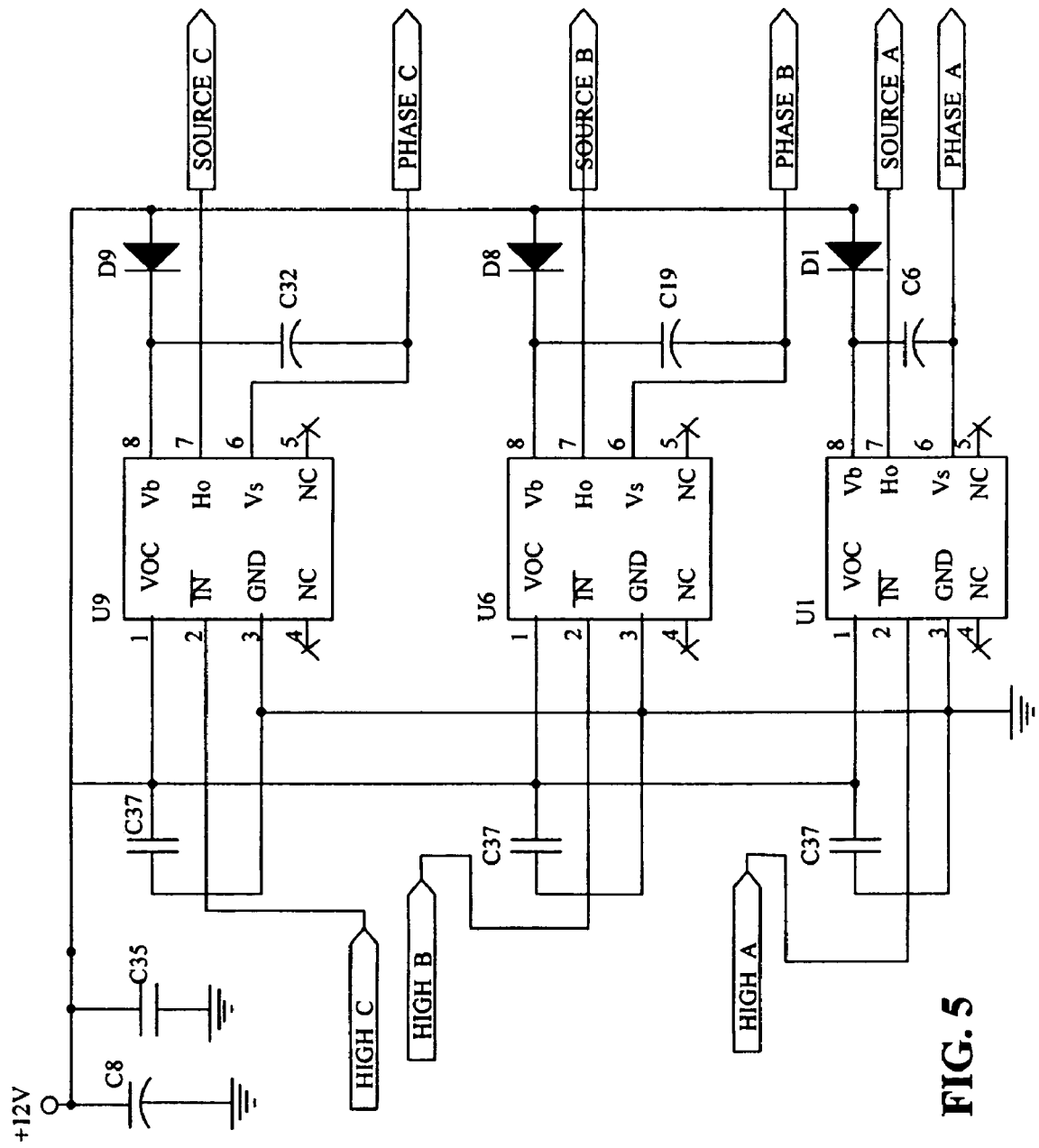
FIG. 5 is a schematic diagram of a portion of the motor control system of FIG. 1 including low current phase drivers.

Referring to FIG. 5, high-side phase driver outputs from pins 2–4 of motor control IC 40 drive low current single channel drivers U1, U6, and U9. Drivers U1, U6, and U9 drive the gate terminals of source FETs Q2, Q6, and Q10, shown in FIGS. 7A and 7B, to follow. Low current drivers U1, U6, and U9 may be, for example, Part No. IR2118S manufactured by International Rectifier of El Segundo, Calif.

Figure 6:
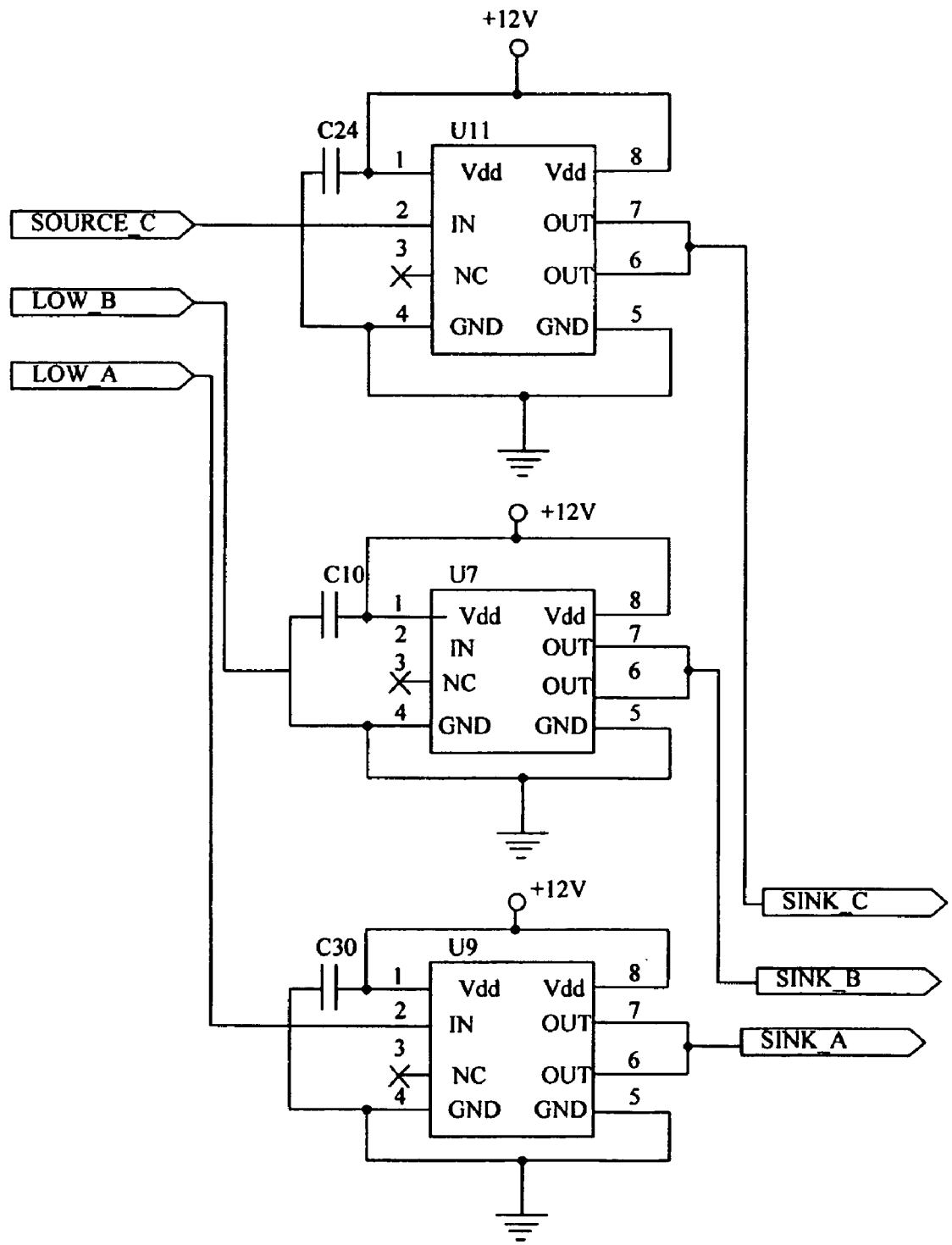
FIG. 6 is a schematic diagram of a portion of the motor control system of FIG. 1 including low current phase sinks.

Referring to FIG. 6, low-side phase driver outputs pin 9–11 of motor control IC 52 drive low current single output drivers U4, U7, and U11, which drive the gate terminals of sink FETs Q3, Q9, and Q11, shown in FIGS. 7A and 7B, of transistor power bridge circuit 30. Low current drivers U4, U7, and U11 may be, for example, Part No. TC442COA manufactured by Microchip Technology Inc. of Chandler, Ariz.

Referring to FIGS. 7A and 7B, phase coil power driver FETs Q2, Q3, Q6, Q9, Q10, and Q11 are thermally coupled to heat sink 56 and provide high-side and low-side switching for phase coils 24a–24c of motor 22. Temperature sensor U3 is also thermally coupled with heat sink 56, and provides a temperature signal to power bridge temperature sensor circuit 31, which is coupled to IO pin 3 of microcontroller 44 (FIGS. 3A and 3B), for sensing an over-temperature condition in transistor power bridge circuit 30, as discussed above.

Figure 9A:
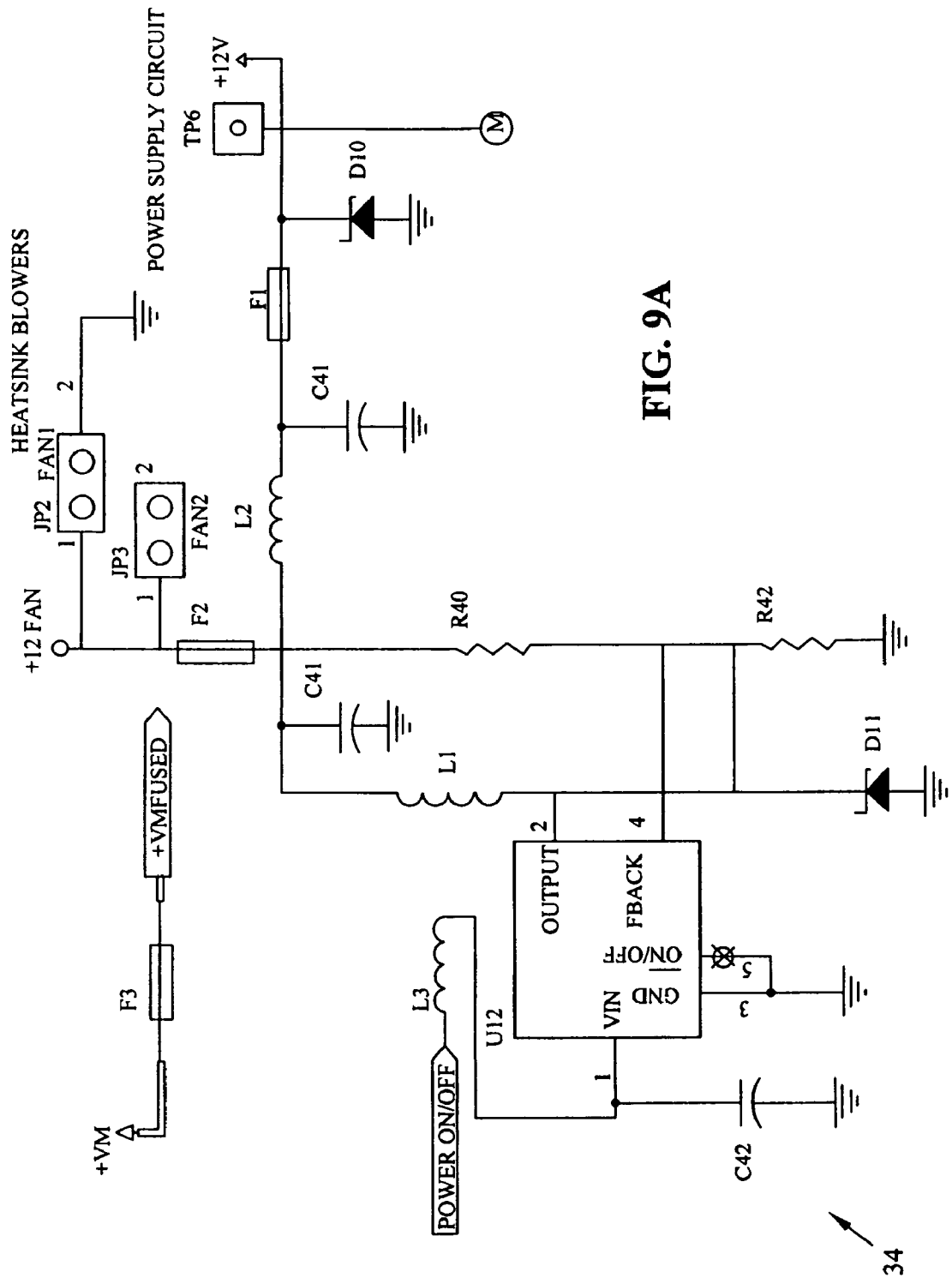
FIGS. 9A–9B are schematic diagrams of a portion of the motor control system of FIG. 1 including a power supply circuit.
Figure 9B:
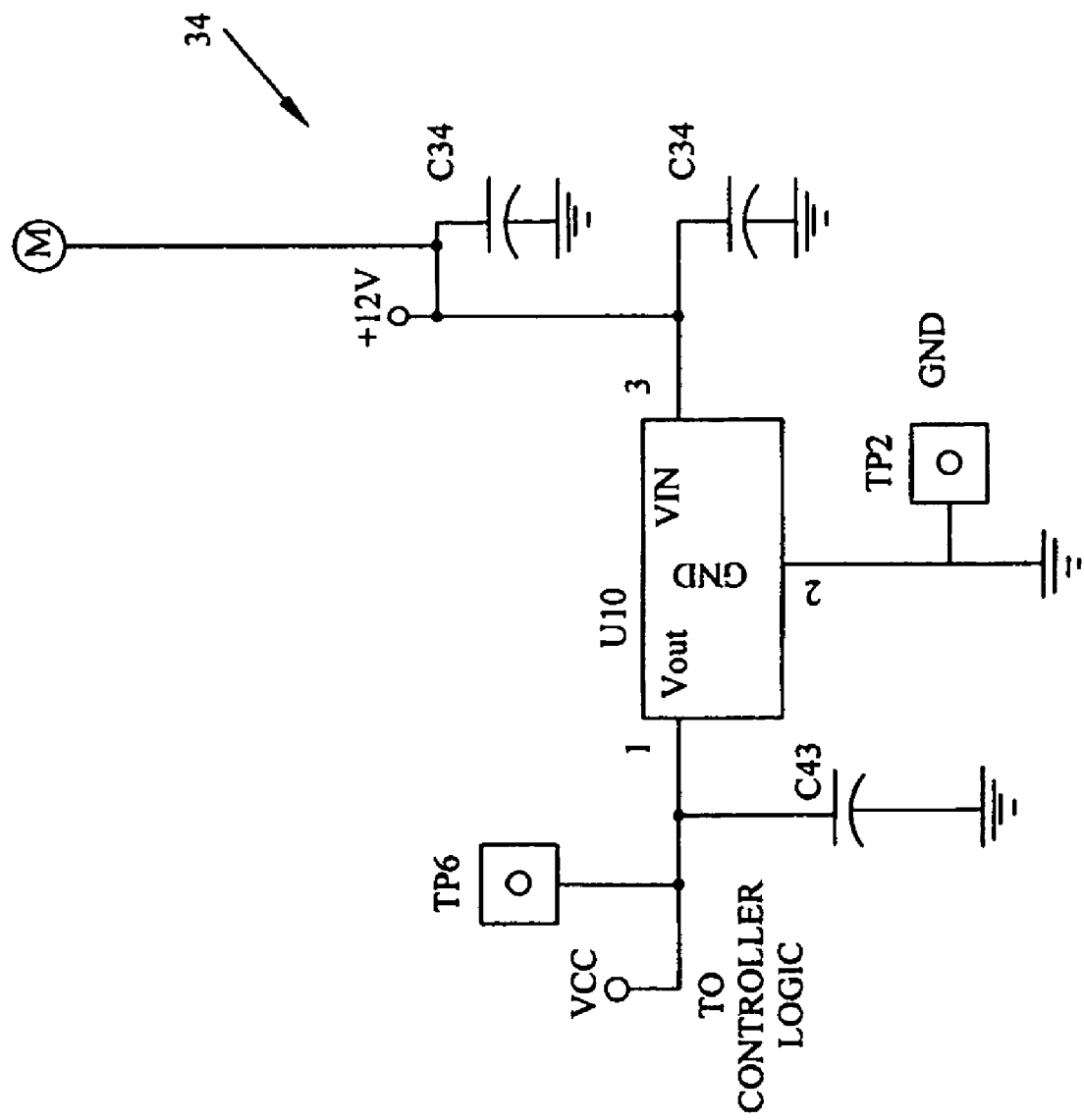

Referring to FIGS. 9A and 9B, switching power supply 34 receives a DC input voltage through external control interface connector JP1 pin, for example, in the range of 8 to 30 VDC. Voltage regulators U12 and U10 as well as other conditioning and protection components provide power, for example, regulated 12 V and 5 V supplies for motor control system 20.

FIGS. 10A–10G show an exemplary flowchart illustrating steps for monitoring and controlling motor control system 20, including detecting locked rotor, stopped rotor, high or low voltage, high or low current, over-temperature, and over and under speed conditions. In the exemplary embodiment, methods 200 and 300 are provided in the form of software enabling microcontroller 44.

Subroutine 200 commences at step 202 and is an exemplary embodiment of the method and apparatus for motor control according to the present invention. In step 202, microcontroller 44 initializes the internal interrupts, A/D converters, and clock, and clears the registers. In step 204, microcontroller 44 clears the internal fault flags, for example, over current, over temperature, and locked or stopped rotor.

In step 206, microcontroller 44 measures the motor voltage provided to A/D converter at pin 5. In step 208, microcontroller 44 checks the logic state of temperature fault input pins 3 and 23. In step 209, microcontroller 44 drives IO pins 16 and 15 high and low, respectively, to precharge motor compensation network capacitors C17 and C45 to a normal run state, substantially eliminating motor 22 RPM overshoot on power-up. At step 210, microcontroller 44 turns on motor 22 by providing a low logic output at motor disable pin 26, which is coupled to ISENSE pin 1 of motor control IC 40. In step 212, microcontroller 44 delays for a preset period of time, for example, 2 seconds, while motor control IC 40 ramps the speed of motor 22 up to the commanded operating speed.

In step 214, microcontroller 44 determines if a preset period of one second time, for example, has expired for periodic motor control system status check. If the preset period has elapsed, step 216 is completed. If one second has not elapsed, step 218 is completed. On initial execution of subroutine 200, the preset period will not have elapsed when step 214 is first completed, so step 218 will be completed to determine if motor 22 is running. If, at step 218, microcontroller 44 determines motor 22 is running, subroutine 200 continues at step 214. If microcontroller 44 determines the motor is not running, then subroutine 200 continues at step 204 in order to again check parameters and attempt motor start.

Figure 10A:
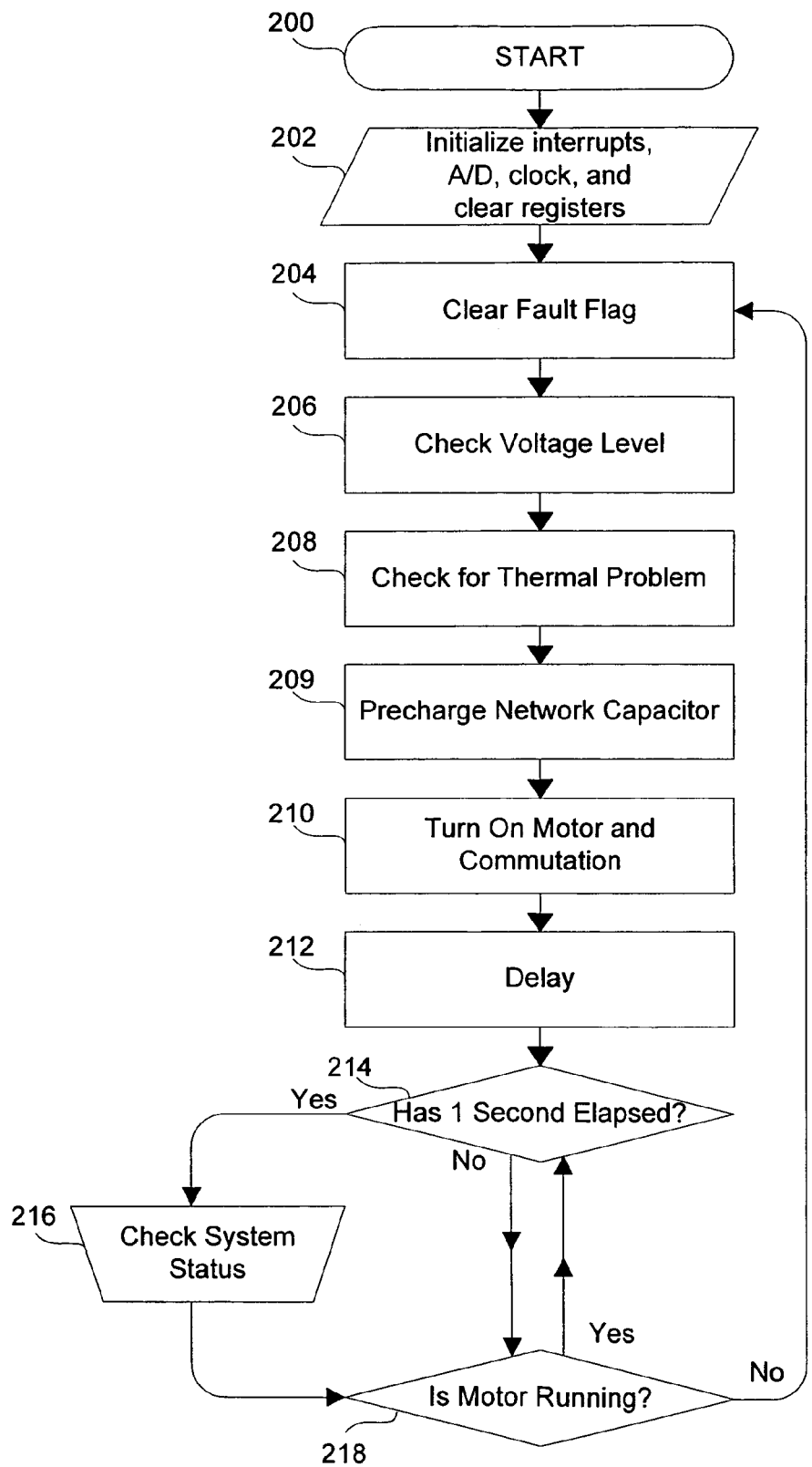
FIGS. 10A–10G are a flowchart diagram illustrating the steps for controlling a DC motor in accordance with the present invention.
Figure 10B:
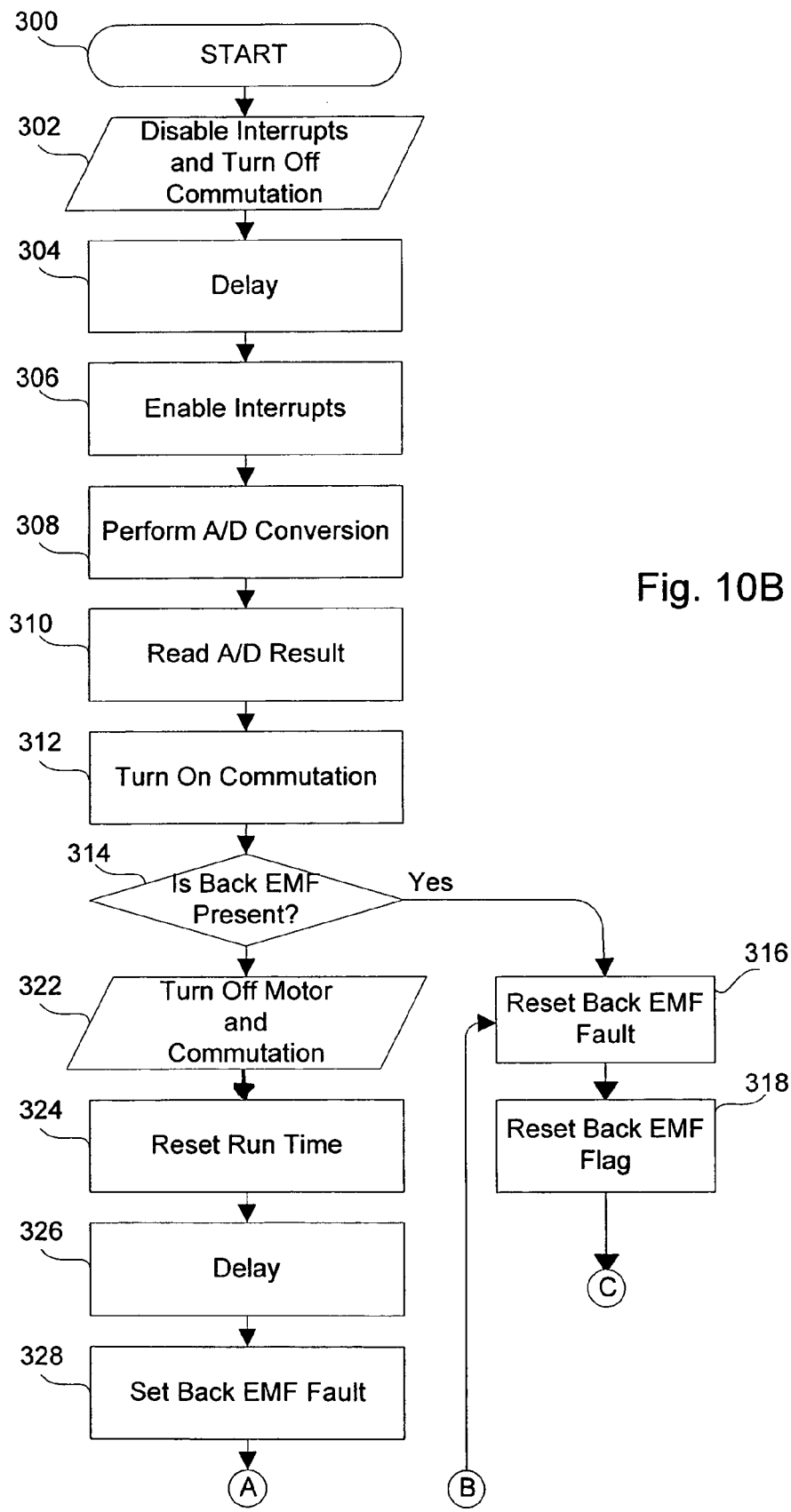

Upon execution of step 216, subroutine 300, which is also an exemplary embodiment of the methods and apparatus for motor control according to the present invention, is completed. Referring to FIG. 10B, subroutine 300, which checks the status of motor control system 20 and provides diagnostics, fault detection and protection for system 20, begins at step 302. In step 302, microcontroller 44 disables internal interrupts and drives motor disable output pin 26 to a high state to disable phase driver outputs of motor control IC 40 and to provide back EMF detection across capacitor C7. In step 304, microcontroller 44 delays, for example, for 0.9 msec. The delay provides time for back EMF to be generated if motor 22 is running, and to charge capacitor C7. In step 306, microcontroller 44 enables internal interrupts. In step 308, microcontroller 44 converts the voltage present at A/D converter pin 4 to digital form. In step 310, microcontroller 44 reads the digital result of the voltage measured across capacitor C7. In step 312, microcontroller 44 returns motor disable output pin 26 to its low state so that motor control IC 40 will again drive phase driver outputs for powering and commutating motor 22.

In step 314, microcontroller 44 determines whether back EMF is present, i.e., the rotor of motor 22 is still in rotation and therefore the rotor is not locked and motor control IC 40 has not lost rotor phase lock. If in step 314 microcontroller 44 determines back EMF is present, step 316 will be completed, else step 322 will be completed. If back EMF is not present and step 322 is completed, microcontroller 44 will turn off motor 22 by driving motor disable output pin 26 high to disable phase driver outputs of motor control IC 40.

In step 324, microcontroller 44 resets a motor run time clock. In step 326, microcontroller 44 will delay, for example, for 10 seconds, before attempting to restart motor 22. In step 328, motor controller 44 sets the back EMF fault bit in the internal status register of microcontroller 44.

Figure 10C:
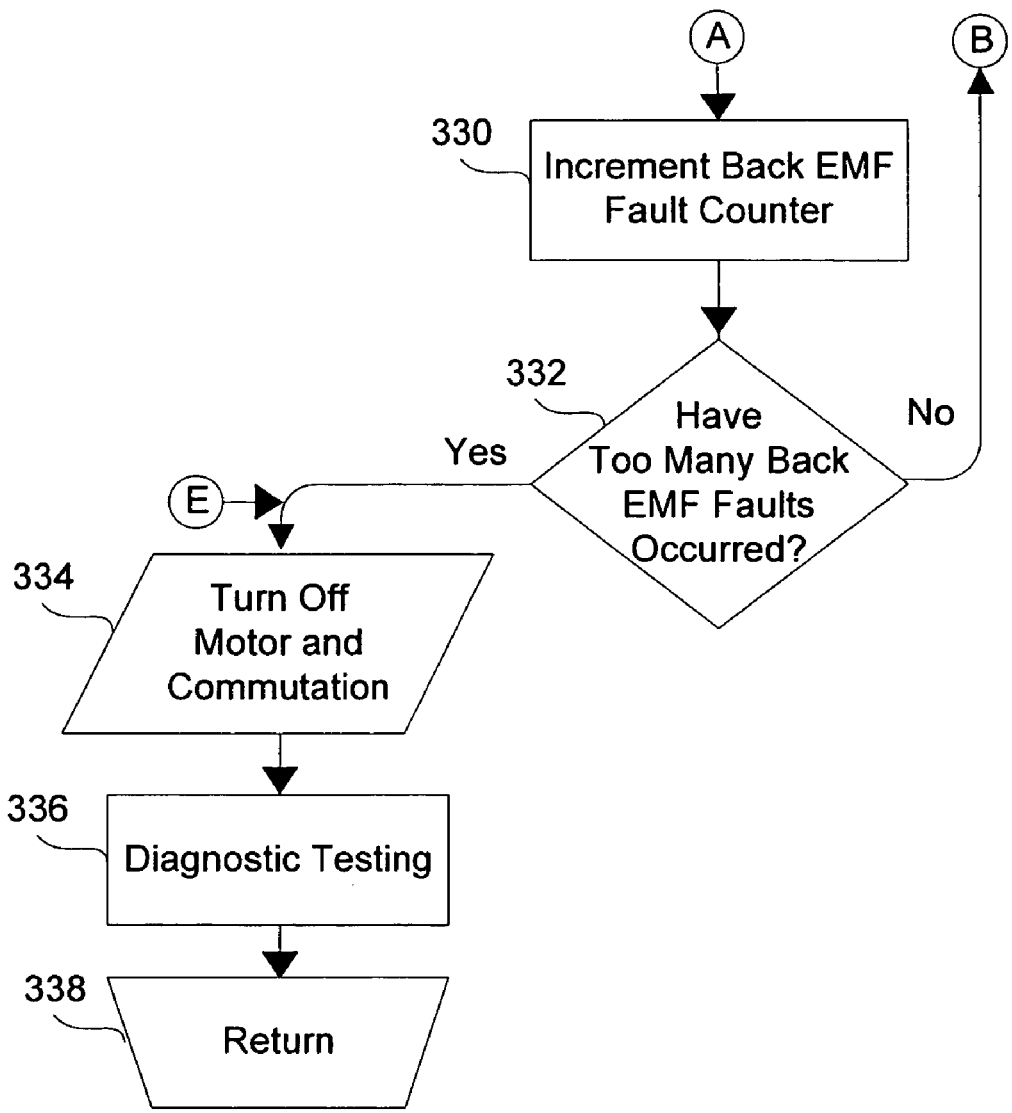
Figure 10D:
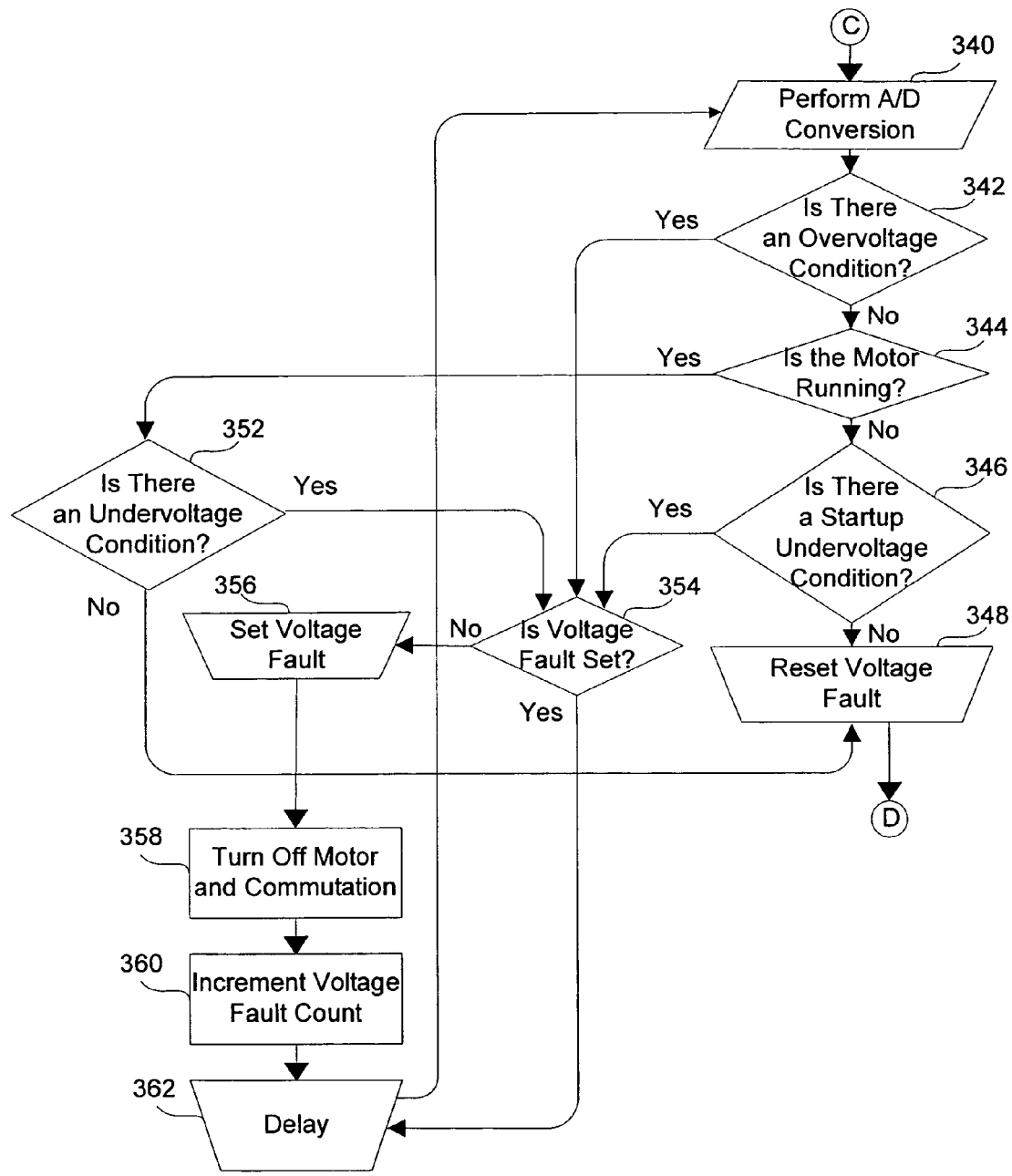

Referring to FIG. 10C, in step 330, microcontroller 44 increments a back EMF fault counter. In step 332, microcontroller 44 determines whether the back EMF fault counter has exceeded a preset limit. If in step 332, microcontroller 44 determines that too many back EMF faults have occurred, step 334 will be completed, else step 316, shown in FIG. 10B, is completed.

In step 334, microcontroller 44 turns off motor 22 by setting motor disable output pin 26 low to disable phase driver output of motor control IC 40. In step 336, because of excess faults, microcontroller 44 is capable of completing diagnostic tests and/or determinations based on fault conditions to determine to underlying system problem, for example, low refrigerant, and whether to attempt restart or a back-up mode of operation, thus protecting system components from damage. In step 338, subroutine 300 ends and returns to step 216 of subroutine 200, shown in FIG. 10A.

If it was determined in step 332 that the preset limit of faults has not been exceeded, then, in step 316, microcontroller 44 resets the back EMF fault bit in the internal status register of microcontroller 44. In step 318, microcontroller 44 resets the back EMF flag internal to microcontroller 44. After step 318 is completed, subroutine 300 continues at step 340 shown in FIG. 10D.

In step 340, analog-to-digital conversion of the motor voltage supplied to pin 5 of microcontroller 44 is completed. In step 342, microcontroller 44 determines whether the motor voltage is above a preset threshold. If the voltage is high, step 354 will be completed, else step 344 is completed. In step 344, microcontroller 44 determines if motor 22 is running. If motor 22 is running, step 352 will be completed, else step 346 is completed. If motor 22 is not running, in step 346, microcontroller 44 determines whether there is a start-up under-voltage condition, i.e., motor voltage supplied to pin 5 is below a preset threshold. If an under-voltage condition is present, step 354 is completed, else step 348 is completed. In step 348, microcontroller 44 resets the voltage status bit. After step 348 is completed, subroutine 300 continues at step 364, shown in FIG. 10E.

If in step 344 microcontroller 44 determines motor 22 is running, step 352 is completed. In step 352, microcontroller 44 determines whether there is an under-voltage condition. If an under-voltage condition exists, step 354 is completed, else step 348 is completed. In step 354, microcontroller 44 determines whether the voltage fault bit in the status register of microcontroller 44 is set. If the voltage fault bit is set, step 362 is completed, else step 356 is completed.

In step 356, microcontroller 44 sets the voltage fault status bit in the status register of microcontroller 44. In step 358, microcontroller 44 turns off motor 22 by driving motor disable output pin 26 low, thereby disabling phase driver outputs of motor control IC 40. In step 360, microcontroller 44 increments the voltage fault count. In step 362, microcontroller 40 delays, for example, for 10 seconds, before repeating a portion of the motor control system status check beginning at step 340.

Figure 10E:
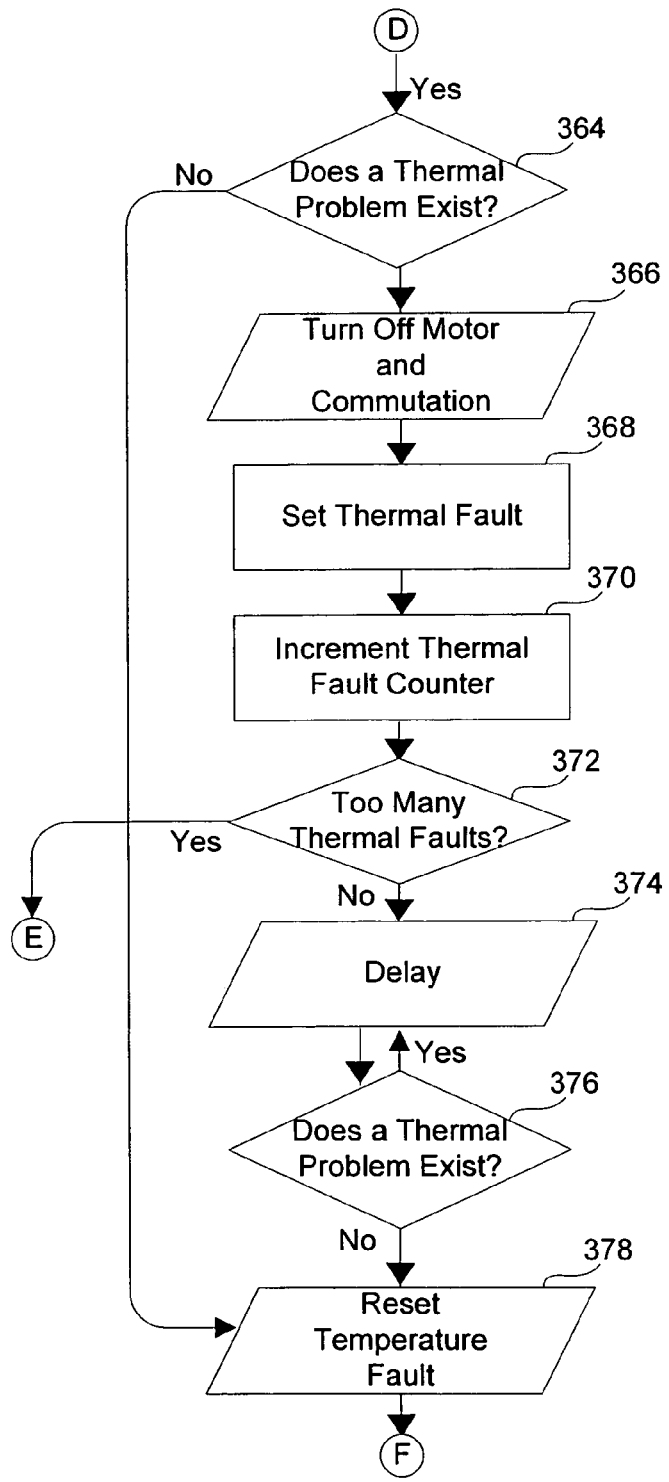
Figure 10F:
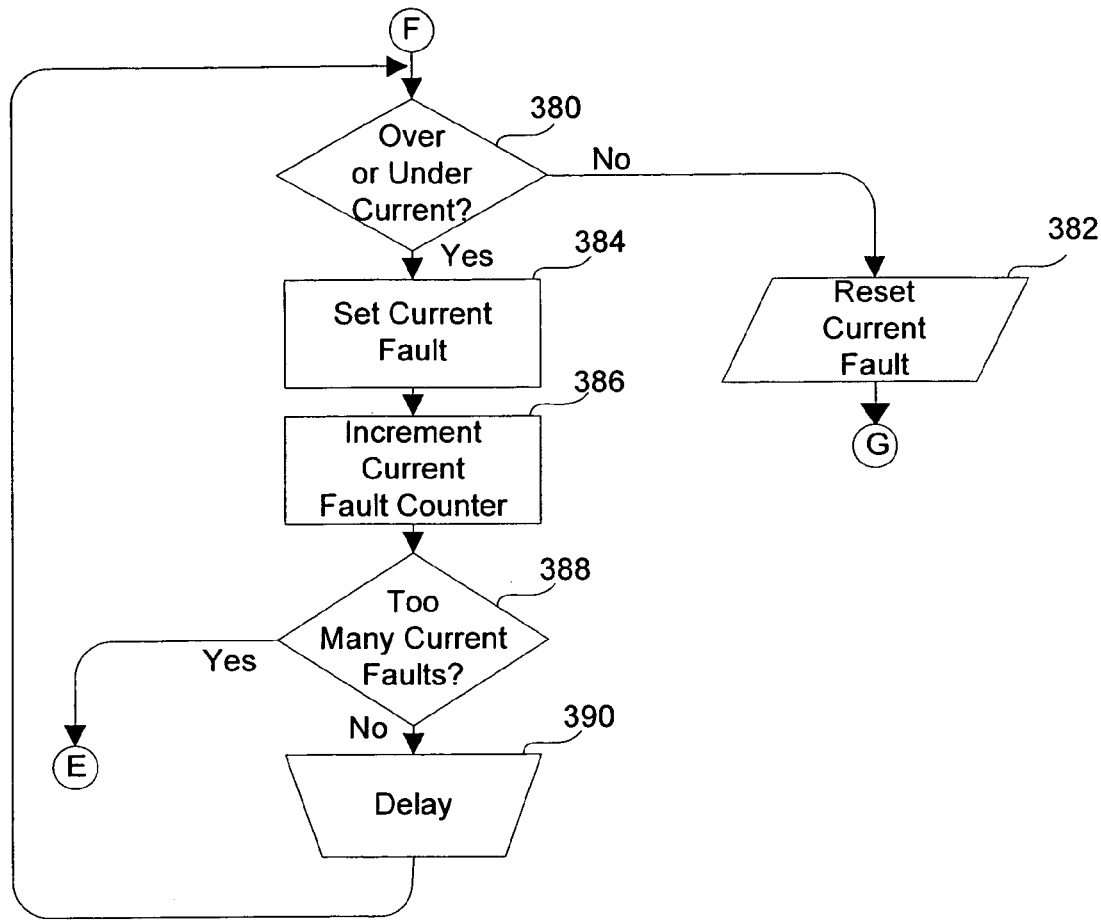
Figure 10G:
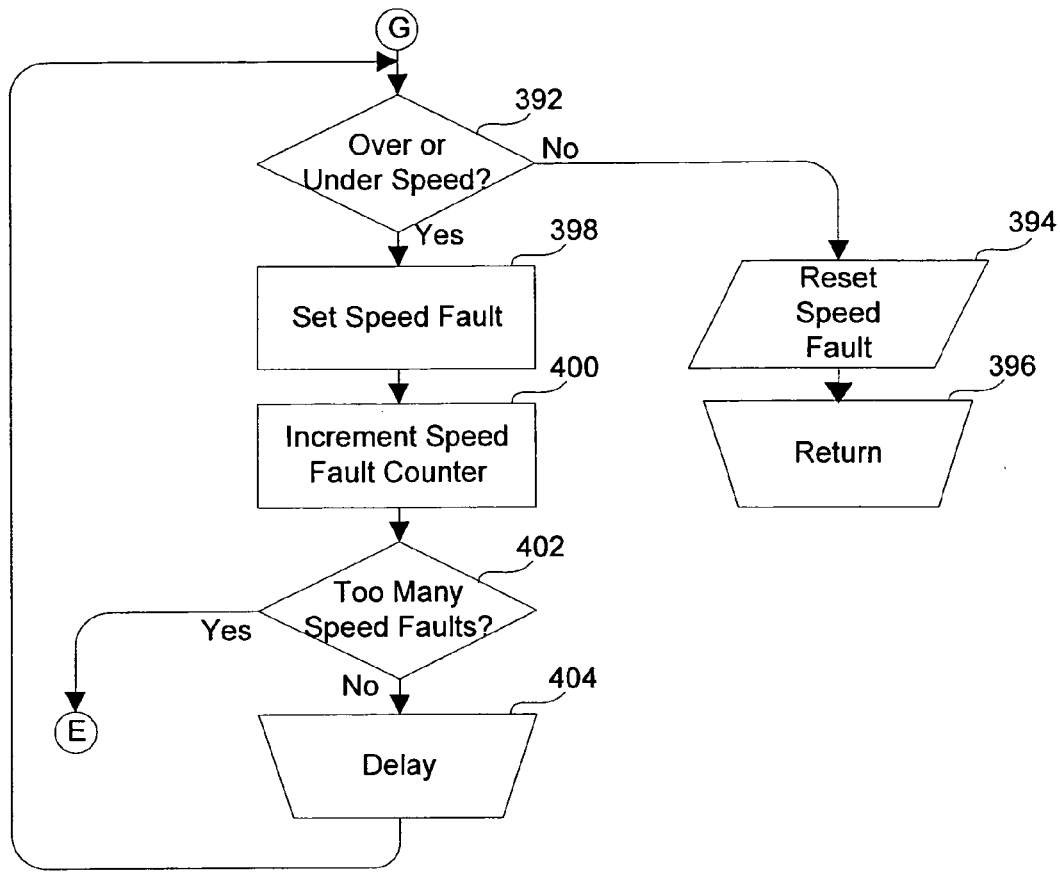

Referring to FIG. 10E, in step 364, microcontroller 44 determines whether a thermal overload condition exists, i.e., the presence of a temperature fault signal at pin 23 or a temperature signal greater than a preset threshold at pin 3. If so, step 366 is completed, else step 378 is completed. In step 366, motor 22 is turned off by microcontroller 44 driving motor disable output pin 26 low, thereby disabling phase driver outputs of motor control IC 40. In step 368, microcontroller 44 sets the thermal fault status bit. In step 370, microcontroller 44 increments a thermal fault counter. In step 372, microcontroller 44 determines whether the thermal fault counter has exceeded a preset limit. If so, subroutine 300 continues at step 334, shown in FIG. 10C. If the thermal fault counter has not exceeded a preset limit, step 374 is completed.

In step 374, microcontroller 44 delays, for example, for 5 seconds, to allow system cooling before again checking temperature signal inputs. In step 376, microcontroller 44 determines whether a temperature fault signal is received at pins 3 or 23. If so, step 374 will again be completed to provide further cooling delay. If a thermal overload condition is not detected, step 378 is completed. In step 378, microcontroller 44 resets the temperature fault status bit.

In step 380, microcontroller 44 determines whether a motor current supply signal received at pin 7 of microcontroller 44 is greater than a preset maximum current limit or less than a preset minimum current limit. If a preset current limit has been exceeded, then step 384 is completed, else step 382 is completed. In step 384, microcontroller 44 sets the current fault status bit. In step 386, microcontroller 44 increments a current fault counter. In step 388, microcontroller 44 determines whether the current fault counter has exceeded a preset limit. If so, subroutine 300 continues at step 334, shown in FIG. 10C. If the current fault counter has not exceeded the preset limit, step 390 is completed. In step 390, microcontroller 44 delays, for example, for 2 seconds, before checking motor supply current again. After step 390 is completed, subroutine 300 continues at step 382 once again check current limits. If in step 380 a current limit was not exceeded, in step 382 microcontroller 44 resets the current fault bit and subroutine 300 continues at step 392, shown in FIG. 10G.

In step 392, microcontroller 44 determines whether the motor speed signal received at pin 11 of microcontroller 44 is greater than a preset maximum speed limit or less than a preset minimum speed limit. If a preset limit has been exceeded, step 398 is completed, else step 394 is completed. In step 398, microcontroller 44 sets the speed fault status bit. In step 400, microcontroller 44 increments a speed fault counter. In step 402, microcontroller 44 determines whether the speed fault counter has exceeded a preset limit. If so, subroutine 300 continues at step 334, shown in FIG. 10C. If the speed fault counter has not exceeded a preset limit, step 404 is completed.

In step 404, microcontroller 44 delays, for example, for 2 seconds, before subroutine 300 continues at step 392 to again check motor speed. If in step 392 a preset motor speed limit was not exceeded, then in step 394 microcontroller 44 resets the speed fault bit. In step 396, subroutine 300 is completed and returned to step 216 of subroutine 200, as shown in FIG. 10A.

The values of the circuit components shown in FIGS. 3–9 are given below in Table 1.

TABLE 1

| Component | Value/Part No. |
|---|---|
| C1 | 10 µF |
| C10 | .1 µF |
| C11 | 1000 µF |
| C12 | .22 µF |
| C13 | .1 µF |
| C14 | .22 µF |
| C15 | 470 pF |
| C16 | 3300 µF |
| C17 | 2.2 µF |
| C18 | 1000 pF |
| C19 | 4.7 µF |
| C2 | 10 µF |
| C20 | 4.7 µF |
| C21 | 10 µF |
| C22 | 4700 pF |
| C23 | .1 µF |
| C24 | .1 µF |
| C25 | 1000 µF |
| C26 | .22 µF |
| C27 | .1 µF |
| C28 | 2.2 µF |
| C29 | 470 PF |
| C3 | 220 µF |
| C30 | .1 µF |
| C31 | 1000 µF |
| C32 | 4.7 µF |
| C33 | 10 µF |
| C34 | 100 µF |
| C35 | .1 µF |
| C36 | 15 µF |
| C36 | 15 µF |
| C37 | .1 µF |
| C38 | 1000 µF |
| C39 | .1 µF |
| C4 | .1 µF |
| C40 | 330 µF |
| C41 | 2200 µF |
| C42 | 220 µF |
| C43 | 220 µF |
| C44 | .1 µF |
| C45 | 4.75 µF |
| C46 | .1 µF |

TABLE 1-continued

| Component | Value/Part No. |
|---|---|
| C47 | 15 pF |
| C48 | 15 pF |
| C49 | .1 µF |
| C50 | 1 µF |
| C52 | .1 µF |
| C5 | 1000 µF |
| C6 | 4.7 µF |
| C7 | .1 µF |
| C8 | 10 µF |
| C9 | 10 µF |
| D1 | S1JDICT |
| D10 | ZM4743ACT 13V |
| D11 | B260 DICT |
| D12 | ES1DDICT |
| D13 | SA36A |
| D14 | B260DIC |
| D2 | SS16GI |
| D3 | SS16GI |
| D4 | MMS2 |
| D5 | SS16GI |
| D6 | SS16GI |
| D8 | S1JDIC |
| D9 | S1JDICT |
| F1 | RXE050 0.5A |
| F2 | RXE050 0.5A |
| F3 | RXE020 02.A |
| L1 | 150 mH |
| L2 | 100 µH |
| L3 | 10 mH |
| P1 | Q4435-B |
| Q10 | IRFP2907 |
| Q11 | IRFP2907 |
| Q2 | IRFP2907 |
| Q3 | IRFP2907 |
| Q5 | FMMT3904CT |
| Q6 | IRFP2907 |
| Q7 | FMMT3904CT |
| Q9 | IRFP2907 |
| R1 | 10K |
| R10 | 16.2K |
| R11 | 10K |
| R12 | 1.21K |
| R13 | 100K |
| R14 | 100K |
| R15 | 10K |
| R16 | 8.2K |
| R17 | 22.1 |
| R18 | 137K |
| R19 | 100K |
| R2 | 10K |
| R20 | 499 |
| R21 | 140K |
| R22 | 80.6K |
| R23 | 47.5 |
| R24 | 1K |
| R25 | 16.2K |
| R26 | 10K |
| R27 | 1.00K |
| R28 | 1.5K |
| R29 | 1.00K |
| R3 | 4.75K |
| R30 | 22.1 |
| R31 | 1.00K |
| R32 | 1.1K |
| R33 | 1.1K |
| R34 | 48.7K |
| R35 | 10K |
| R36 | 47.5 |
| R37 | 2.2K |
| R38 | 16.2K |
| R39 | 1.1K |
| R40 | 10.5K |
| R41 | 22.1 |
| R42 | 1.21K |
| R43 | .010 2W |
| R44 | .010 2W |
| R45 | 1.1K |

TABLE 1-continued

| Component | Value/Part No. |
|---|---|
| R46 | 8.2K |
| R47 | 16.2K |
| R48 | 16.2K |
| R49 | 16.2K |
| R5 | 10K |
| R50 | 75 |
| R51 | 1.5K 3W |
| R52 | 1.5K 3W |
| R53 | 1.5K 3W |
| R54 | 100 |
| R55 | 2.2K |
| R56 | 4.75K |
| R6 | 1.1KK |
| R7 | 10K |
| R8 | 1.1K |
| R9 | 47.5 |
| U1 | IR2118S |
| U10 | NJM78L05VA |
| U11 | TC4420C0A |
| U12 | 2576HVT-ADJ |
| U13 | 74AHCIG04DBV |
| U14 | PS2505-1 |
| U15 | PS2505-1 |
| U2 | PIC16F870 |
| U3 | LM34DH |
| U4 | TC4420COA |
| U5 | ML4425CS |
| U6 | IR2118S |
| U7 | TC4420C0A |
| U8 | LMC6062AIM |
| U9 | IR2118S |

While this invention has been described as having exemplary embodiments and scenarios, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A motor control system for controlling a brushless and sensorless DC motor system having a plurality of phase coils, comprising:
a motor control integrated circuit having a plurality of motor driver outputs and a control input for operating said plurality of motor driver outputs, said plurality of motor driver outputs coupled to the plurality of phase coils; and
a fault detection circuit coupled with said control input and capable of selectively switching the state of said control input to momentarily and substantially simultaneously disable all of said plurality of motor driver outputs, said fault detection circuit being coupled to at least one of the plurality of phase coils and capable of detecting a threshold back EMF voltage from the at least one of the plurality of phase coils while all of said motor driver outputs are momentarily disabled and providing a fault signal if the sensed back EMF is below a preset threshold.

2. The motor control system of claim 1, wherein said fault detection circuit includes a capacitor coupled to the at least one of the plurality of phase coils, said capacitor receiving back EMF and said fault detection circuit detecting said threshold back EMF voltage across said capacitor.

3. The motor control system of claim 2, wherein said fault detection circuit includes at least one optical isolator coupling the at least one of the plurality of phase coils and said capacitor.

4. A motor control system for controlling a brushless and sensorless DC motor system having a plurality of phase coils, comprising:
a motor control integrated circuit having a plurality of motor driver outputs and a control input for operating said plurality of motor driver outputs, said plurality of motor driver outputs coupled to the plurality of phase coils; and
a fault detection circuit coupled with said control input and capable of selectively switching the state of said control input to momentarily disable said plurality of motor driver outputs, said fault detection circuit being coupled to at least one of the plurality of phase coils and capable of detecting a threshold back EMF voltage from the at least one of the plurality of phase coils, wherein said fault detection circuit includes a microcontroller having an analog-to-digital converter coupled to the at least one of the plurality of phase coils and an output port coupled to said control input.

5. The motor control system of claim 4, further comprising at least one optically coupled isolator coupling said analog-to-digital converter and the at least one of the plurality of phase coils.

6. The motor control system of claim 4, further comprising software enabling said microcontroller to:
switch a control signal coupled to said control input, momentarily disabling said plurality of motor driver outputs;
measure back EMF generated by the at least one of the plurality of phase coils and received by said analog-to-digital converter; and
switch said control signal coupled to said control input upon measuring back EMF above a threshold level, enabling said plurality of motor driver outputs.

7. The motor control system of claim 6, wherein said software further enables said microcontroller to delay switching said control signal for a preset time upon measuring back EMF below a threshold level in order to delay re-enabling said plurality of motor driver outputs.

8. The motor control system of claim 7, wherein said microcontroller is capable of providing a fault signal and said software further enables said microcontroller to switch said control signal to disable said plurality of motor driver outputs, and to provide said fault signal upon measuring a back EMF below a threshold level more than a preset number of times.

9. A motor control system for controlling a brushless and sensorless DC motor system in a hermetic compressor, said system having a plurality of phase coils, comprising:
a motor control integrated circuit having a plurality of motor driver outputs and a control input for operating said plurality of motor driver outputs, said plurality of motor driver outputs coupled to the plurality of phase coils; and
a fault detection circuit coupled with said control input, said fault detection circuit capable of selectively switching the state of said control input to momentarily and substantially simultaneously disable all of said plurality of motor driver outputs, said fault detection circuit capable of detecting a plurality of electrical and nonelectrical fault conditions of the motor system, said fault detection circuit capable of providing a control signal to said control input to disable all of said plurality of motor driver outputs upon detection of at least one of said plurality of electrical and nonelectrical fault conditions relating to said compressor.

10. The motor control system of claim 9, further comprising a voltage sensing circuit coupled to a voltage supply of the system, said voltage sensing circuit coupled to said fault detection circuit, said fault detection circuit capable of switching said control input to disable said plurality of motor driver outputs upon said voltage supply being above or below a preset limit.

11. The motor control system of claim 9, further comprising a current sensing circuit coupled to at least one of the plurality of phase coils, said current sensing circuit coupled to said fault detection circuit, said fault detection circuit capable of switching said control input to disable said plurality of motor driver outputs upon a detected phase coil current being above or below a preset limit.

12. The motor control system of claim 9, wherein said motor control integrated circuit outputs a speed signal related to motor speed, and said fault detection circuit is capable of receiving said speed signal and switching said control input to disable said plurality of motor driver outputs upon said motor speed being above or below a preset motor speed limit.

13. The motor control system of claim 9, wherein said control input is an over current protection input of said motor control integrated circuit.

14. A motor control system for controlling a brushless and sensorless DC motor system having a plurality of phase coils, comprising:
a motor control integrated circuit having a plurality of motor driver outputs and a control input for operating said plurality of motor driver outputs, said plurality of motor driver outputs coupled to the plurality of phase coils;
a fault detection circuit coupled with said control input and capable of detecting a plurality of electrical and nonelectrical fault conditions of the motor system, said fault detection circuit capable of providing a control signal to said control input to disable said plurality of motor driver outputs upon detection of at least one of said plurality of electrical and nonelectrical fault conditions; and
a temperature sensing circuit coupled to said fault detection circuit.

15. The motor control system of claim 14, further comprising a motor housing and a temperature sensor thermally coupled to said motor housing and electrically coupled to said temperature sensing circuit.

16. The motor control system of claim 14, further comprising a temperature sensor and a compressor driven by said motor and having a housing, said temperature sensor thermally coupled to said housing and electrically coupled to said temperature sensing circuit.

17. The motor control system of claim 14, further comprising:
a transistor power bridge circuit coupled between said plurality of motor driver outputs and the plurality of phase coils;
a heat sink thermally coupled to said transistor power bridge circuit; and
a power bridge temperature sensor thermally coupled to said heat sink and electrically coupled to said temperature sensing circuit.

18. A method for detecting faults in a motor control system for a brushless and sensorless DC motor system having a plurality of phase coils, comprising the steps of:
providing a motor control integrated circuit having a plurality of power driver outputs coupled to the plurality of phase coils, and having a control input capable of selectively enabling the plurality of power driver outputs;
momentarily and substantially simultaneously disabling all of said plurality of power driver outputs,
detecting a motor system fault by measuring EMF on at least one of the plurality of phase coils while all of said plurality of power driver outputs are momentarily disabled; and
switching the control input to disable all of the plurality of power driver outputs upon detecting a motor system fault indicated by measured EMF below a preset threshold to thereby stop motor operation.

19. The method of claim 18, wherein the step of detecting a motor system fault includes the further steps of:
switching the control input to momentarily disable the plurality of power driver outputs;
then measuring the back EMF generated in the plurality of phase coils; and
then switching the control input to enable the plurality of power driver outputs.

20. The method of claim 18, wherein the step of detecting a motor system fault includes the steps of:
measuring the supply voltage of the motor; and
determining a fault upon the measured supply voltage being above or below a preset voltage threshold.

21. The method of claim 18, wherein the step of detecting a motor system fault includes the steps of:
measuring the supply current for at least one of the plurality of phase coils; and
determining a fault upon the measured supply current being above or below a preset current threshold.

22. A method for detecting faults in a motor control system for a brushless and sensorless DC motor system having a plurality of phase coils, comprising the steps of:
providing a motor control integrated circuit having a plurality of power driver outputs coupled to the plurality of phase coils, and having a control input capable of selectively enabling the plurality of power driver outputs;
detecting a motor system fault by measuring EMF on at least one of the plurality of phase coils; and
switching the control input to disable the plurality of power driver outputs upon detecting a motor system fault indicated by excess, measured EMF below a preset threshold to thereby stop motor operation;
wherein the step of detecting a motor system fault includes the steps of:
measuring the temperature of a portion of the motor system; and
determining a fault upon the measured temperature exceeding a preset threshold.

23. A method for detecting faults in a motor control system for a brushless and sensorless DC motor system having a plurality of phase coils, comprising the steps of:
providing a motor control integrated circuit having a plurality of power driver outputs coupled to the plurality of phase coils, and having a control input capable of selectively enabling the plurality of power driver outputs;
detecting a motor system fault by measuring EMF on at least one of the plurality of phase coils; and
switching the control input to disable the plurality of power driver outputs upon detecting a motor system fault indicated by excess, measured EMF below a preset threshold to thereby stop motor operation;
wherein the motor system includes a compressor driven by the motor, and wherein the step of detecting a motor system fault includes the steps of:
determining a minimum motor speed below which the compressor may be damaged due to lack of adequate lubrication;
measuring the motor speed; and
determining a fault upon the measured motor speed being above or below the minimum motor speed.

24. A method for detecting faults in a motor control system for a brushless and sensorless DC motor system having a plurality of phase coils, comprising the steps of:
providing a motor control integrated circuit having a plurality of power driver outputs coupled to the plurality of phase coils, and having a control input capable of selectively enabling the plurality of power driver outputs;
detecting a motor system fault by measuring EMF on at least one of the plurality of phase coils; and
switching the control input to disable the plurality of power driver outputs upon detecting a motor system fault indicated by excess, measured EMF below a preset threshold to thereby stop motor operation;
wherein the motor system includes a compressor driven by the motor, and wherein the step of determining a motor system fault includes the steps of:
determining a maximum motor speed above which compressor valve damage may occur;
measuring the motor speed; and
determining a fault upon the measured motor speed exceeding the maximum motor speed.

25. A method for detecting a locked or stopped rotor in a motor control system for a brushless and sensorless DC motor system having a plurality of phase coils driven by power driver outputs, comprising the steps of:
momentarily and substantially simultaneously disabling all of the power driver outputs;
then measuring the back EMF generated from the plurality of phase coils while all of the power driver outputs are momentarily disabled; and
then enabling all of the power driver outputs after a time period dependent on the measured back EMF.

26. The method of claim 25, further comprising the following steps after the step of then measuring the back EMF:
if measured back EMF is above a preset threshold, setting the time period to zero.

27. The method of claim 25, further comprising the steps of:
measuring a motor supply voltage; and
upon the measured voltage being above or below a preset range, disabling the power driver outputs.

28. The method of claim 25, further comprising the steps of: measuring a motor supply current supplied to at least one of the plurality of phase coils, and
upon the measured current being above or below a preset range, disabling the power driver outputs to the plurality of phase coils.

29. The method of claim 25, wherein the motor system includes a compressor having valves and driven by the motor, and further comprising the steps of:
determining a maximum motor speed above which the valves may be damaged;
measuring the motor speed; and
upon the motor speed exceeding the maximum motor speed, disabling the power driver outputs.

30. A method for detecting a locked or stopped rotor in a motor control system for a brushless and sensorless DC motor system having a plurality of phase coils driven by power driver outputs, comprising the steps of:
disabling the power driver outputs;
then measuring the back EMF generated from the plurality of phase coils;
then enabling the power driver outputs after a time period dependent on the measured back EMF;
if measured back EMF is above a preset threshold, setting the time period to zero;
incrementing a counter each time measured back EMF is below the preset threshold; and
upon the counter exceeding a preset limit, disabling the power driver outputs.

31. A method for detecting a locked or stopped rotor in a motor control system for a brushless and sensorless DC motor system having a plurality of phase coils driven by power driver outputs, comprising the steps of:
disabling the power driver outputs;
then measuring the back EMF generated from the plurality of phase coils;
then enabling the power driver outputs after a time period dependent on the measured back EMF;
measuring the temperature of a portion of the motor system; and
upon the measured temperature exceeding a threshold, disabling the power driver outputs.

32. A method for detecting a locked or stopped rotor in a motor control system for a brushless and sensorless DC motor system having a plurality of phase coils driven by power driver outputs, comprising the steps of:
disabling the power driver outputs;
then measuring the back EMF generated from the plurality of phase coils; and
then enabling the power driver outputs after a time period dependent on the measured back EMF;
wherein the motor system includes a compressor driven by the motor, and further comprising the steps of:
determining a minimum motor speed below which the compressor may be damaged due to lack of adequate lubrication;
determining the motor speed; and
upon the motor speed being below the minimum motor speed, disabling the power driver outputs.

33. A fluid handling system, comprising:
a pump;
a brushless DC motor for driving said pump, said motor having a plurality of phase coils; and
a motor control system coupled to said motor, said motor controller system including:
a motor control circuit having at least one motor driver output coupled to said plurality of phase coils; and
a microcontroller having an A/D converter coupled to at least one of said plurality of phase coils and having software enabling said microcontroller to provide an output signal coupled to said motor control circuit for momentarily disabling said at least one motor driver output, said microcontroller capable of measuring a voltage level of back EMF generated in said at least one of said plurality of phase coils upon said at least one motor driver output being disabled.

34. The fluid handling system of claim 33, wherein said pump includes a compressor.

35. The fluid handling system of claim 33, wherein said software enables said microcontroller to provide said output signal to keep said at least one motor driver output disabled upon said voltage level being below a preset limit.

36. An actuator control system for controlling a sensorless DC actuator having a plurality of phase coils, comprising:
- an actuator control integrated circuit having a control input and a plurality of driver outputs, said control input adapted for selectively disabling said driver outputs, said driver outputs coupled to the plurality of phase coils; and
- a voltage measuring circuit coupled with the plurality of phase coils and providing a control signal coupled with said control input;
- said voltage measuring circuit capable of selectively switching the state of said control input to momentarily and substantially simultaneously disable all of said driver outputs;
- said voltage measuring circuit measuring a voltage received from the plurality of phase coils upon said voltage measuring circuit momentarily providing said control signal to substantially simultaneously disable all of said driver outputs,
- said voltage measuring circuit further providing said control signal upon said received voltage being below a preset threshold.

37. The actuator control system of claim 36, wherein the actuator includes a brushless DC motor and the actuator control integrated circuit is adapted for brushless DC motor control.

38. The actuator control system of claim 37, wherein said voltage measuring circuit includes a microcontroller.

39. The actuator control system of claim 37, wherein said voltage measuring circuit includes a capacitor coupled to the plurality of phase coils and said received voltage is measured across said capacitor.

* * * * *